(12) United States Patent
McDonald et al.

(10) Patent No.: US 10,822,249 B2
(45) Date of Patent: Nov. 3, 2020

(54) ADDITIVES IN FILTER AS YOU POUR SYSTEM

(71) Applicant: Brita LP, Oakland, CA (US)

(72) Inventors: Jonathan D. McDonald, Danville, CA (US); Maria Garcia Ochomogo, Pleasanton, CA (US); Edith Ramos da Conceicao Neta, Livermore, CA (US); David Lee Lyons, Del Mar, CA (US); Roger V. Lee, Danville, CA (US)

(73) Assignee: Brita LP, Oakland, CA (US)

( * ) Notice: Subject to any disclaimer, the term of this patent is extended or adjusted under 35 U.S.C. 154(b) by 406 days.

(21) Appl. No.: 15/643,357

(22) Filed: Jul. 6, 2017

(65) Prior Publication Data

US 2018/0016158 A1    Jan. 18, 2018

Related U.S. Application Data

(60) Provisional application No. 62/361,376, filed on Jul. 12, 2016.

(51) Int. Cl.
| | | |
|---|---|---|
| *B67D 3/00* | (2006.01) | |
| *C02F 1/00* | (2006.01) | |
| *C02F 1/28* | (2006.01) | |
| *C02F 1/68* | (2006.01) | |
| *B01D 27/08* | (2006.01) | |

(52) U.S. Cl.
CPC ............ *C02F 1/003* (2013.01); *B67D 3/0019* (2013.01); *B67D 3/0051* (2013.01); *B01D 27/08* (2013.01); *B67D 2210/0001* (2013.01); *C02F 1/283* (2013.01); *C02F 1/688* (2013.01); *C02F 2201/006* (2013.01); *C02F 2307/04* (2013.01)

(58) Field of Classification Search
CPC .... B01D 27/00; B67D 3/0019; B67D 3/0051; B67D 2210/0001; C02F 1/003; C02F 1/283; C02F 1/50; C02F 1/687; C02F 1/688; C02F 2201/006; C02F 2307/04; B01F 1/0027; B01F 1/0033
See application file for complete search history.

(56) References Cited

U.S. PATENT DOCUMENTS

| | | | | |
|---|---|---|---|---|
| 4,696,742 A | * | 9/1987 | Shimazaki | .............. C02F 1/283 210/287 |
| 5,137,731 A | * | 8/1992 | Casberg | .................. C02F 1/688 424/405 |

(Continued)

*Primary Examiner* — Lucas A Stelling
(74) *Attorney, Agent, or Firm* — Thomas C. Feix

(57) ABSTRACT

On example of a fluid dispensing system includes an unfiltered water container body defining an internal storage volume configured to hold a volume of water, a fluid outlet arranged for fluid communication with the internal storage volume, and a filter element positioned in the internal storage volume. With this configuration, a water dispensing process can be performed in which a single continuous stream of unfiltered water from the unfiltered water container body can pass through the filter element and be dispensed from the unfiltered water container body as a stream of filtered water. A water soluble tablet with an additive is positioned in the internal storage volume downstream of the filter medium such that the filtered water can pass out of the filter element and into contact with the water soluble tablet before being dispensed from the fluid outlet.

20 Claims, 27 Drawing Sheets

(56) References Cited

U.S. PATENT DOCUMENTS

| | | | | |
|---|---|---|---|---|
| 2008/0202992 A1* | 8/2008 | Bridges | ............... | C02F 1/003 |
| | | | | 210/85 |
| 2011/0300275 A1* | 12/2011 | Lackey | ............... | C02F 1/003 |
| | | | | 426/431 |
| 2012/0055862 A1* | 3/2012 | Parekh | ............... | C02F 1/283 |
| | | | | 210/244 |

* cited by examiner

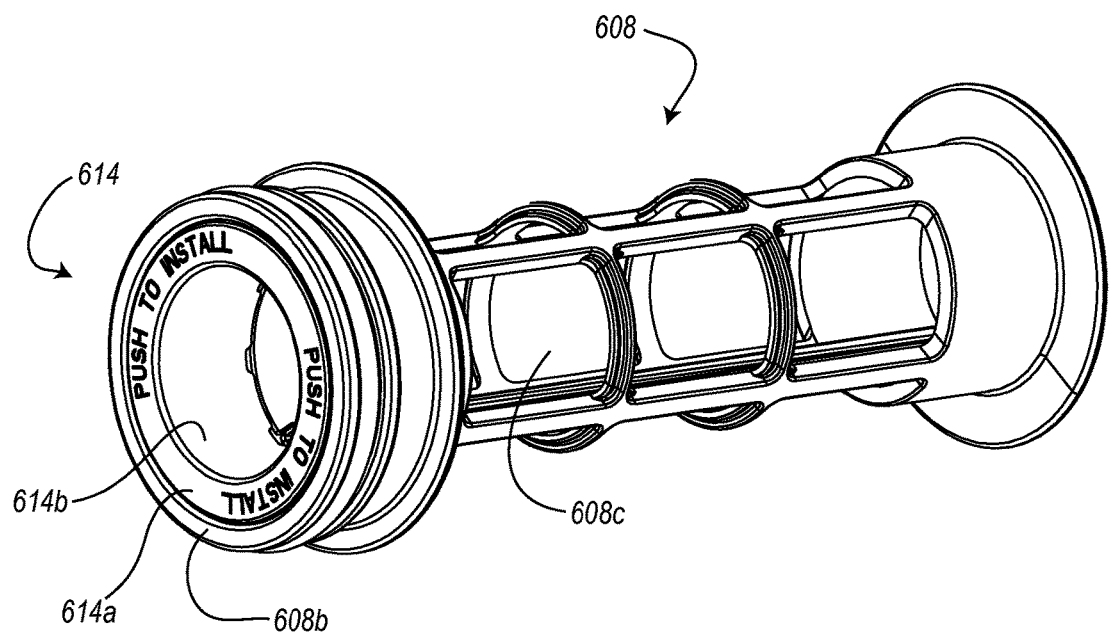
*FIG. 10E*
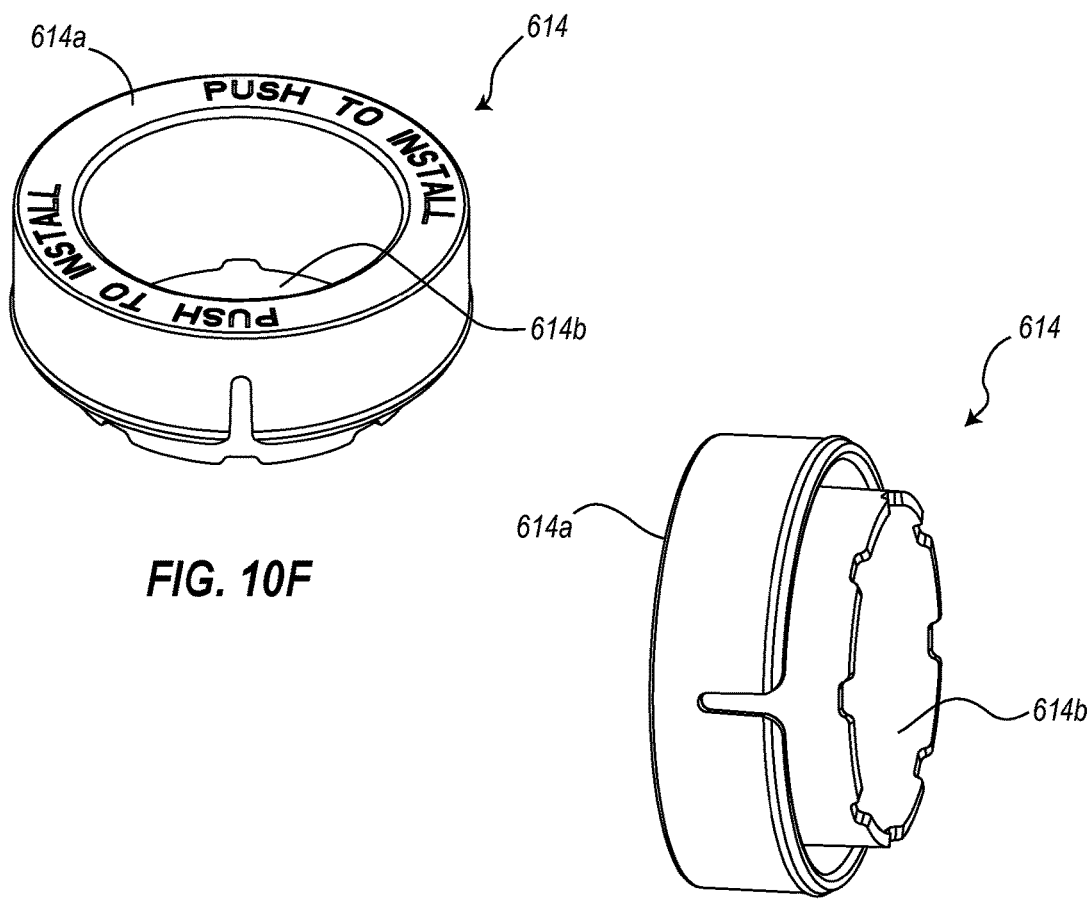
*FIG. 10F*
*FIG. 10G*

ADDITIVES IN FILTER AS YOU POUR SYSTEM

RELATED APPLICATIONS

This application hereby claims priority to, and the benefit of, U.S. Provisional Patent Application Ser. 62/361,376, entitled ADDITIVES IN FILTER AS YOU POUR SYSTEM, and filed Jul. 12, 2016. The aforementioned application is incorporated herein in its entirety by this reference.

FIELD OF THE INVENTION

At least some example embodiments of the invention are directed to the use of additives in fluid dispensing systems, such as filter as you pour (FAYP) systems. In at least some embodiments, one or more additives are positioned in an FAYP system so as to be introduced to filtered fluid as that filtered fluid is being poured from a container. The additive can be in a solid form, or a liquid form, and no particular form of additive is necessarily required. The scope of the invention is not limited to FAYP systems and, accordingly, other embodiments of the invention are concerned with systems and devices that are not FAYP systems or FAYP devices.

BACKGROUND

There are a variety of fluid filtering and dispensing systems that provide for the use of an additive. However, typical fluid filtering and dispensing systems have demonstrated a variety of shortcomings.

For example, some filtering and dispensing systems employ a filter cartridge that is configured so that fluid to be filtered passes radially into the filter element, while the filtered fluid exits the filter element by way of an axial passageway. In some instances, additives have been introduced into this axial passageway. However, the presence of additives in that location tends to impair flow rates through the filter cartridge.

The aforementioned problem is of special concern in systems which require that fluid be passed through the filter into a reservoir before the fluid can be dispensed. One disadvantage of such systems is that they are relatively slow to provide filtered water to user. Thus, introduction of an additive into a fluid passageway of the filter cartridge further slows the passage of fluid through the filter, and thereby introduces an additional delay in providing filtered water to the user.

Filter as you pour (FAYP) systems such as the examples disclosed herein have proven beneficial in that filtered water is made available by the FAYP systems to a user relatively more quickly than systems in which water must first be poured through a filter into a reservoir, and then subsequently dispensed by a user. However, there remains a need to be able to employ one or more additives in an FAYP system.

Thus, it would be beneficial to provide FAYP systems and additives, as well as non-FAYP systems, that are configured such that the additive can be introduced into filtered water as that filtered water is being dispensed from the system. It would also be useful to employ additives that provide desirable taste, health, and/or other benefits. As well, it would be useful to use the additives in gravity-operated systems that do not rely on any other source of pressurization to effect fluid flow. It would further be beneficial to include the additive in the filter cartridge of the system so as to eliminate any need for the consumer to manipulate the additive, cartridge, or other part of the system. It would also be useful for the additive to have about the same life as the filter media. Finally, it would be beneficial for the additive to be configured and arranged so that a relatively consistent concentration of additive is provided in the dispensed fluid.

ASPECTS OF SOME EXAMPLE EMBODIMENTS

In one example embodiment, an FAYP system includes a filter cartridge with an additive tablet having a generally donut shaped configuration. The additive tablet is positioned in the filter cartridge in such a way that filtered fluid exiting filter media of the filter cartridge passes through an opening in the additive material before being dispensed from an associated container under the influence of gravity. In this way, the additive can be introduced into the filtered fluid without materially affecting the flow rate through the filter cartridge, or the dispensation of water from the container.

This form of delivery of the agent may be referred to herein as passive delivery since there is no affirmative process or step by which the additive is introduced and, instead, the additive is simply picked up by the fluid as the fluid passes into contact with the additive. Over time, most or all of the additive will be absorbed into the fluid stream and, as such, additives disclosed herein may be referred to as being consumable in nature, or as a consumable item. In some embodiments at least, the tablet may be configured and arranged so that it is only in contact with the fluid during a dispensing operation and is not otherwise in contact with the fluid to be dispensed.

As well, the additive is physically and chemically configured to help ensure that a relatively consistent concentration of additive is present in each volume of dispensed fluid. The useful life of the additive tablet may be about the same as the useful life of the filter media. Further examples of FAYP systems in which one or more additive tablets could be employed are addressed in more detail immediately below.

In one embodiment, an FAYP system is configured to provide filtered water as water is poured from an outlet of the system. The system may comprise a container body defining an internal storage volume for holding water, a lid, and a filter assembly. With regard to the container, it is noted that some known devices such as pitchers and bottles include an unfiltered water reservoir that defines an outlet in which a filter is positioned. The outlet and filter are configured and arranged such that when the pitcher or bottle is sitting on a table or countertop in an upright, that is, non-dispensing position, gravity causes water from the unfiltered water reservoir to eventually pass down out of the unfiltered water reservoir, through the filter, and into a filtered water reservoir located below the unfiltered water reservoir. That is, when the bottle or pitcher is thus disposed, the unfiltered water reservoir is configured to eventually drain itself by way of the outlet and filter. In contrast, containers according to some embodiments of the invention, such as bottles and pitchers for example, are configured to hold water or other fluids indefinitely, at least when the container is in an upright, that is, a non-dispensing position. This is due, in at least some embodiments, to the fact that the filter may be positioned above at least some of the fluid in the container.

With continued reference now to the example embodiment, the system also comprises an inlet (e.g., in the lid or container body) through which unfiltered water may be introduced into the container body, as well as an outlet (e.g., in the lid or container body) through which water within the container body may be poured, the water being simultaneously filtered as it is poured therefrom. The lid may be releasably attachable over the container body, and the filter assembly may be attachable to at least one of the lid or container body. The filter assembly may be configured and arranged so as to be in a flow stream of the water as the water is poured out of the container body through the outlet so that the stream of water exiting the outlet is filtered as it is poured from the container body. The filter assembly may include filter media that comprises an activated carbon textile material that presents a curved surface to the flow stream of water, such that an exit flow rate of water passing through the filter assembly and poured from the outlet is at least 0.3 gallons per minute (GPM).

Another example embodiment is directed to a filter-as-you-pour system configured to provide filtered water as water is poured from an outlet of the system, where the system comprises a container body defining an internal storage volume for holding water, a lid that is releasably attachable over the container body, an inlet (e.g., in the lid or container body) through which unfiltered water may be introduced into the container body, an outlet (e.g., in the lid or container body) through which water within the container body may be poured and simultaneously filtered, and a filter assembly attached to at least one of the lid or the container body. The filter assembly is disposed proximate the outlet of the system, so that water in the container body passes through the filter assembly and is filtered only as it is poured out of the container body. In other words, there is no filter in the fill path associated with the inlet of the container body, so that water entering into the container body through the inlet does not initially pass through a filter before entering the container body.

Because such an embodiment includes no filter in the fill path, there is no delay associated with water being introduced into the inlet, and the time that it enters the interior storage volume of the container body. As such, the water disposed within the interior storage volume is unfiltered by the container system, until it exits through the outlet (where it passes through the filter assembly just prior to exiting the outlet). Such a configuration allows for faster filling of the container as compared to existing systems that include a filter within the fill path (e.g., disposed between the inlet and the storage volume). Such embodiments which provide for filtering of the water only as it is poured out of the container body may employ a filter media comprising an activated carbon textile material arranged within the filter assembly so as to present a curved surface to the flow stream of water. This arrangement has been surprisingly found by the present inventors to provide for relatively high flow rates, making it possible as a practical matter to filter the water only on exit (i.e., filter only as-you-pour).

Another embodiment is directed to a filter-as-you-pour system configured to provide filtered water as water is poured from an outlet of the system, where the system includes a container body defining an internal storage volume, a lid that is releasably attachable over the container body, and a filter assembly. The lid may include an inlet through which unfiltered water may be directly introduced into the container body without passing through a filter. This advantageously provides for no fill delay as there is no delaying obstacle (e.g., a filter) between the inlet and the storage volume of the container body. The lid may also include an outlet through which water within the container body may be poured, the unfiltered water being simultaneously filtered as it is poured out of the container body through the outlet. The filter assembly may be configured as a vertical elongate filter assembly that is releasably attachable to the lid at a location that is aligned with and below the outlet, such that a longitudinal axis of the filter assembly is aligned with the outlet. The filter assembly is disposed over the outlet so as to prevent any bypass, so that all water poured through the outlet passes through the filter assembly.

Yet other example embodiments employ an active additive delivery system and process. In one particular example, a system and device are configured to introduce one or more additives, in liquid form, into a volume of filtered water by way of an aspiration process. One example aspiration process and device involves the use of an eductor that implements a venturi effect which is used to introduce the additive into a flowing stream of filtered water. Depending upon variable such as the nature of a specific additive, and desired flow rate, it is possible to use solid form additives in an aspiration process. Other methods and systems of active additive delivery can alternatively be used.

BRIEF DESCRIPTION OF THE DRAWINGS

To further clarify the above and other aspects of example embodiments of the present invention, a more particular description of the invention will be rendered by reference to specific embodiments thereof which are illustrated in the drawings located in the specification. It is appreciated that these drawings depict only typical embodiments of the invention and are therefore not to be considered limiting of its scope. The invention will be described and explained with additional specificity and detail through the use of the accompanying drawings in which:

FIGS. 10A-10G disclose aspects of an example FAYP pitcher system that employs a tablet additive delivery mechanism;

DETAILED DESCRIPTION OF EXAMPLE EMBODIMENTS

A. Definitions

Figure 1:
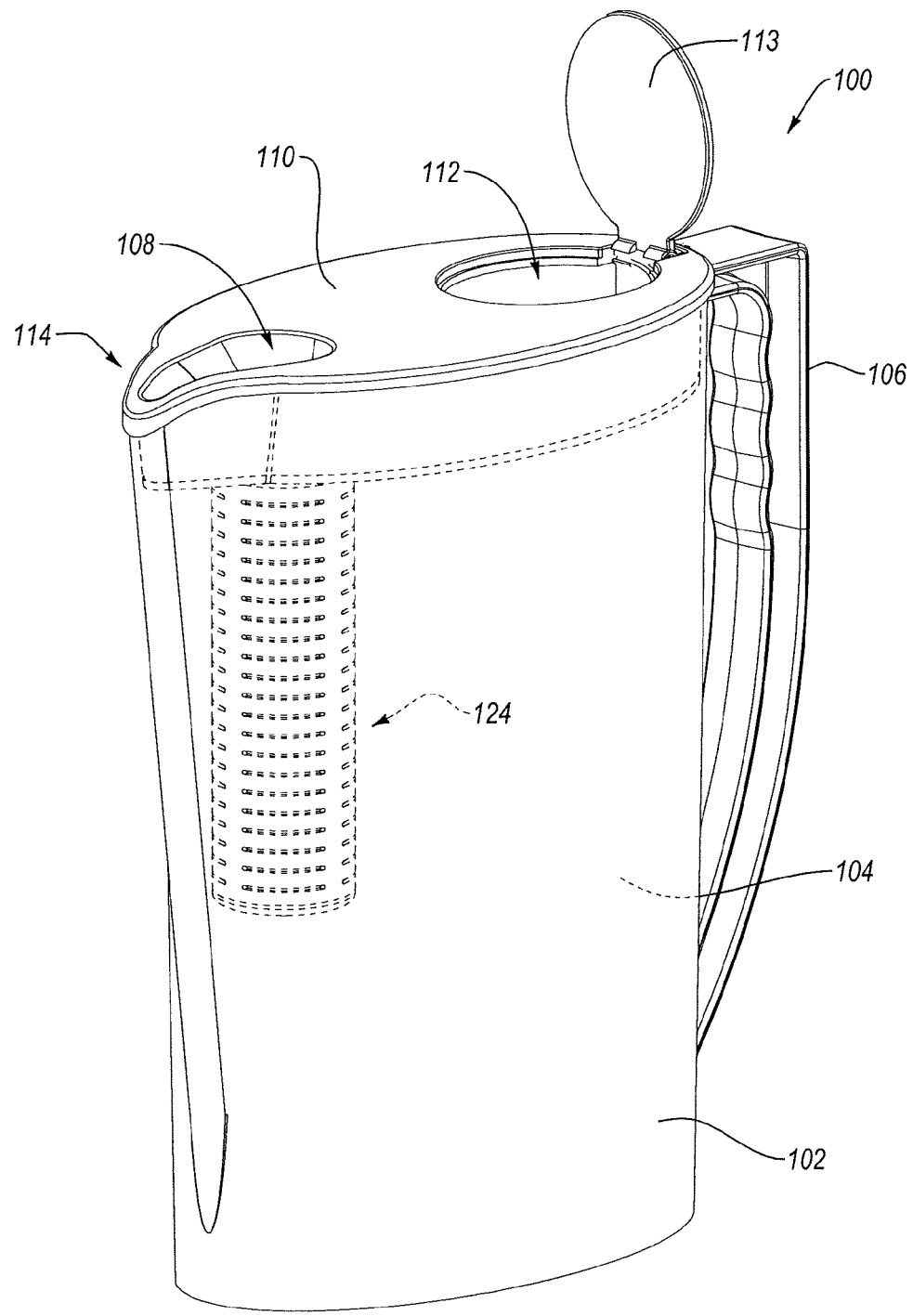
FIG. 1 is a perspective view of an exemplary filter-as-you-pour pitcher system according to an embodiment of the present invention.

Before describing some example embodiments of the present invention in detail, it is to be understood that this invention is not limited to particularly exemplified systems or process parameters that may, of course, vary. It is also to be understood that the terminology used herein is for the purpose of describing particular embodiments of the invention only, and is not intended to limit the scope of the invention in any manner.

All publications, patents and patent applications cited herein, whether supra or infra, are hereby incorporated by reference in their entirety to the same extent as if each individual publication, patent or patent application was specifically and individually indicated to be incorporated by reference.

The term "additive" refers to any material or combination of materials, of whatever form and/or composition, that is introduced into a flow of fluid, which may be filtered fluid such as filtered water, at the same time or about the same time as the fluid is dispensed from a container. As such, additives include, but are not limited to, actives, binders which include hydrophobic binders, agents, mold release agents, lubricants, anti-oxidation coatings, flavors, colors, antioxidants, flavor enhancers, flavor modifiers, taste masking agents, anti-bitter agents, sweeteners, fillers such as malto-dextran, thickeners, emulsifiers, solvents, water, and antimicrobials. Additives further include any other materials not specifically listed here but disclosed elsewhere herein. Finally, additives include and any combination of one or more of the foregoing.

The term "comprising" which is synonymous with "including," "containing," or "characterized by," is inclusive or open-ended and does not exclude additional, un-recited elements or method processes.

The term "consisting essentially of" limits the scope of a claim to the specified materials or acts "and those that do not materially affect the basic and novel characteristic(s)" of the claimed invention.

The term "consisting of" as used herein, excludes any element, act, or ingredient not specified in the claim.

It must be noted that, as used in this specification and the appended claims, the singular forms "a," "an" and "the" include plural referents unless the content clearly dictates otherwise. Thus, for example, reference to a "surfactant" includes one, two or more surfactants.

Various aspects of the present devices and systems may be illustrated by describing components that are coupled, attached, and/or joined together. As used herein, the terms "coupled", "attached", and/or "joined" are used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements present.

Various aspects of the present devices, systems, and methods may be illustrated with reference to one or more exemplary embodiments. As used herein, the term "exemplary" means "serving as an example, instance, or illustration," and should not necessarily be construed as preferred or advantageous over other embodiments disclosed herein.

The term "tablet" is intended to be broad in scope and embraces, among other things, any configuration or physical form of additives used in an FAYP system or any other fluid dispensing system. As such, a tablet includes, but is not limited to, a solid disk, a disk having a donut configuration (with a hole there through), and any other form that includes one or more openings through which fluid can flow. Other example tablet configurations are disclosed elsewhere herein.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

In the application, effective amounts are generally those amounts listed as the ranges or levels of ingredients in the descriptions, which follow hereto. Unless otherwise stated, amounts listed in percentages ("wt %'s") are in wt % (based on 100 weight % active) of the particular material present in the referenced composition, any remaining percentage typically being water or an aqueous carrier sufficient to account for 100% of the composition, unless otherwise noted. For very low weight percentages, the term "ppm" corresponding to parts per million on a weight/weight basis may be used, noting that 1.0 wt % corresponds to 10,000 ppm.

B. Appendices

It is noted that reference is made herein to various Appendices, namely, Appendices A, B, C and D. Such Appendices form part of the disclosure of U.S. Provisional Patent Application Ser. 62/361,376, entitled ADDITIVES IN FILTER AS YOU POUR SYSTEM, and filed Jul. 12, 2016, which, as noted in the 'Related Applications' section hereof, has been incorporated herein in its entirety. As such, and although they are not attached hereto, the Appendices A, B, C and D form part of the present disclosure.

C. Introduction

The present disclosure is directed to systems capable of filtering water as the water is poured from a container of the system, and which include one or more additives that are introduced into filtered water as the filtered water is dispensed from the container. Such a system may include a container body defining an internal storage volume for holding water, a lid that may be releasably attachable over the container body, and a filter assembly (e.g., disposed within the container body). The system includes an inlet through which unfiltered water is introduced into the container body, and an outlet through which filtered water may be poured. The filter assembly may be attachable to at least one of the lid or the container body, and is disposed relative to the outlet so as to be in a flow stream of the water as the water is poured from the container. For example, the filter assembly may be disposed proximate the outlet (e.g., just upstream from the outlet). The filter media of the filter assembly may comprise an activated carbon fibrous textile material that presents a curved surface to the flow stream of water. The inventors have found that the activated carbon textile material, where arranged so as to present a curved surface to the water penetrating therethrough, surprisingly provides for relatively high flow rates (e.g., at least 0.3 GPM) while providing relatively high levels of contaminant removal, which makes possible the filter as you pour configuration from a practical perspective.

D. Some Example FAYP Systems

FIG. 1 shows an exemplary system 100, which may operate as a filter-as-you-pour system. As illustrated, system 100 may include a container body 102 that defines an internal storage volume 104 for holding water (e.g., unfiltered water). As shown, container body 102 may include a handle 106 to aid in pouring water disposed within storage volume 104 out an outlet 108 of system 100. System 100 may further include a lid 110 that may be disposed over container body 102. Lid 110 may be releasably attachable relative to container body 102, e.g., it may include any suitable complementary locking structures disposed in lid 110 and/or container body 102 so as to allow lid 110 to be releasably attached or retained by container body 102. Friction fits between the two components, or any of various lock and key locking structures may be employed, e.g., so as to ensure that lid 110 does not inadvertently fall off of container body 102. Additional details of exemplary locking mechanisms are disclosed in a patent application bearing Ser. No. 15/038,982, filed the same day as the present application and herein incorporated by reference.

Lid 110 may include an inlet 112, through which unfiltered water may be introduced into the container body 102. An inlet cover 113 may be provided. In an embodiment, outlet 108 may be defined within lid 110. In another embodiment, the inlet 112, outlet 108, or both may be defined within the container body 102. As illustrated in FIG. 1, container body 102 may be configured as a pitcher, e.g., including a spout 114, adjacent outlet 108. Spout 114, as illustrated, may be defined by structures in both container body 102 and lid 110. For example, container body 102 is shown as including a portion which tapers or narrows towards spout 114. Similarly, lid 110 is shown as including a corresponding cross-sectional shape, also being tapered at the portion corresponding to spout 114, so that lid 110 fits into the open top of container body 102. In addition, lid 110 is shown as including flared or tapered portions 116 adjacent outlet 108, providing a surface which slopes downward from a top of lid 110 to outlet 108. As a result, flared portion 116 defines a larger opening adjacent the top of lid 110, which slopes downward, much like a funnel, towards outlet 108.

In addition, in the illustrated embodiment, outlet 108 is shown as being disposed at the proximal end of spout 114, so that water exiting outlet 108 will flow along the tapered or narrowing spout portion 118 of lid 110, until it reaches the extreme end of spout portion 118, and exits the system 100 (e.g., into a glass, other container, etc.).

A flow control device 120 (e.g., a slit valve, grating or screen) may be disposed proximate outlet 108 (e.g., within outlet 108) to regulate an exit flow rate of water poured through outlet 108. For example, the flow control device may aid in ensuring that the exit flow rate of water from the system 100 is more consistent than might occur without such a flow control device. In addition, the flow control device may aid in ensuring that the flow rate is within a desired range of exit flow rates (e.g., from about 0.5 gallons per minute to about 0.8 gallons per minute). Further details of such flow control devices that may optionally be disposed within the system are disclosed in a patent application bearing Ser. No. 15/039,002, filed the same day as the present application and herein incorporated by reference in its entirety.

System 100 further includes a filter assembly 124 that is attachable to lid 110, container body 102, or both lid 110 and container body 102. Filter assembly 124 is disposed within system 100 so as to be in a flow stream of the water as the water is poured from container body 102, through outlet 108. As a result, the stream of water exiting through outlet 108 is simultaneously filtered as it is poured from container body 102.

Figure 2:
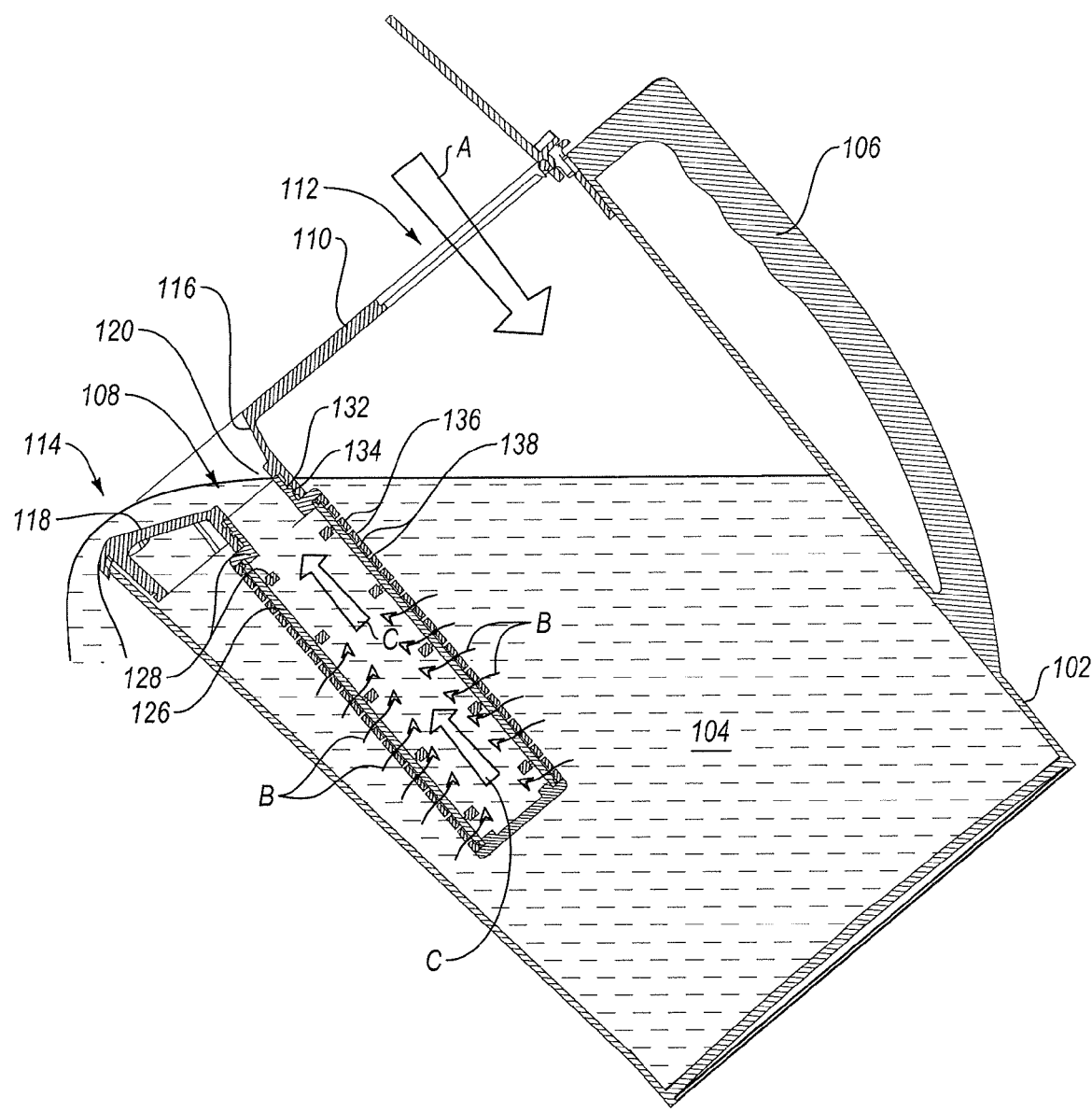
FIG. 2 is a schematic cross-sectional view through the system of FIG. 1 showing a flow path of water as it is introduced into the container of the system, as it flows into the filter housing, through the filter housing, and out the outlet of the system.

Filter assembly 124 may be releasably attachable to lid 110 through a thread and groove structural arrangement, e.g., so that filter assembly 124 may screw into lid 110, around or within outlet 108. In the illustrated embodiment, as perhaps best seen in cross-sectional view of FIG. 2, grooves 132 may be formed into the inside surface of outlet 108, with corresponding threads 134 formed into an exterior surface of the top end of filter assembly 124. Alternatively, the threads may be formed on the inside of outlet 108, and corresponding grooves formed into the exterior surface at the top of filter assembly 124. In another embodiment, the threads or grooves of outlet 108 could be disposed on an exterior surface of outlet 108, and the corresponding threads or grooves of filter assembly 124 could be disposed on an interior surface of the top end of the filter assembly, so that the filter assembly is releasably attachable over and about (e.g., surrounding) the outlet 108. The illustrated embodiment of FIG. 2 shows releasable attachment within outlet 108.

Figure 3A:
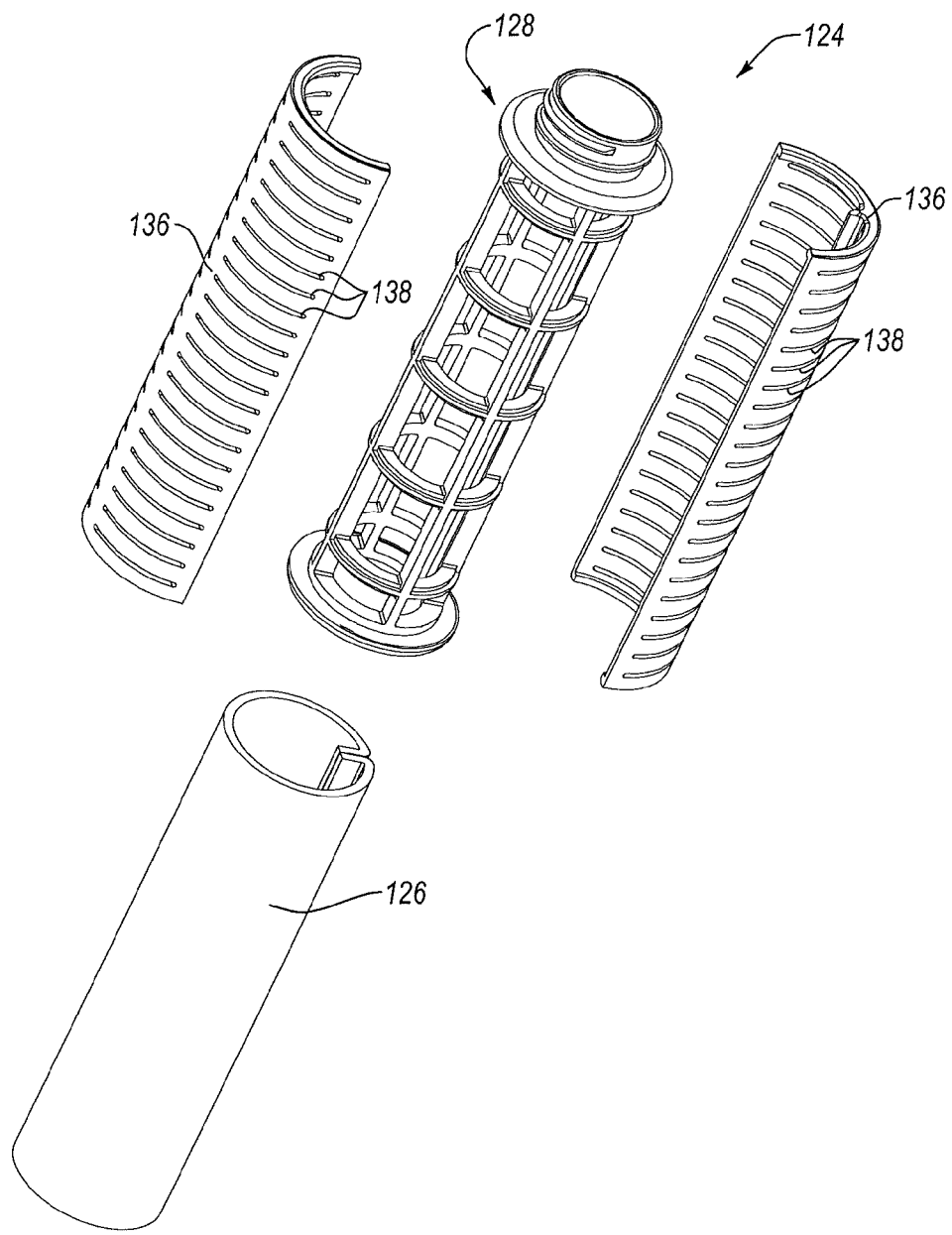
FIG. 3A is an exploded perspective view of an exemplary filter assembly such as that included in the system of FIG. 1.

An exploded view of filter assembly 124 is shown in FIG. 3A, and filter assembly 124 is shown as being generally cylindrical, although it will be appreciated that other configurations may also be employed. In any case, the filter assembly may be configured to filter unfiltered water within container body 102 as it is poured therefrom, while at the same time providing a flow rate of water through outlet 108 that is at least about 0.3 gallons per minute (GPM). In another embodiment, the flow rate may be at least about 0.5 GPM. In an embodiment, the filter assembly is advantageously configured to provide and allow for exit flow rates from about 0.3 GPM to about 2 GPM, from about 0.3 GPM to about 1 GPM, or from about 0.5 GPM to about 0.8 GPM. Such flow rates are typically not possible with filter assemblies including granulated, particulate filter media typically employed in gravity fed or gravity flow water filtration systems that include a reservoir into which unfiltered water is introduced, which water then trickles through the filter assembly and into the container body (e.g., pitcher), where it can then be poured therefrom. For example, filter assemblies based on such filter media typically require 3 to 8 minutes to filter 1 liter of water (e.g., flow rates of 0.03 GPM to 0.09 GPM). In an embodiment, the present systems may not include any such reservoir.

The filter assemblies employed in the present invention may advantageously provide for much faster filtration flow rates, such as those above. In an embodiment, the filter media of the filter assembly comprises an activated carbon textile material (i.e., such a textile material is fibrous), which textile material is arranged within the filter assembly so as to present a curved surface to the flow stream of water. Such textile materials disposed so as to present a curved surface to the flow stream of water have surprisingly been found to provide and allow for significantly faster flow rates as compared to the 3 to 8 minutes to filter 1 liter. For example, exit flow rates may be from about 0.3 GPM to about 2 GPM, or 0.3 GPM to about 1 GPM.

The textile material may be formed from structural elements selected from the group consisting of fibers, yarns, filaments, flexible porous composites, combinations thereof, etc., which may be woven, non-woven, braided, or otherwise joined into a textile material. Such textile materials may typically be comprised of relatively high aspect ratio structural elements whose length is orders of magnitude (e.g., 1-5 orders of magnitude) larger than the diameter.

Such textile materials also may have varying degrees of structural integrity based on the amount, size, and distribution of the structural elements. For example some textile structures may have the structural elements loosely held generally parallel to each other while in other embodiments the structural elements may be twisted around a longitudinal axis or they may be interlaced orthogonally relative to each other or they may be randomly oriented relative to each other. The physical dimensions and orientation of the structural elements of the textile material also create a depth to thickness ratio for the resulting textile material, along with pores of various sizes.

For best use in water filtration applications these textile materials preferably may have an optimal combination of thickness and pore size distribution to not only allow water to flow at the desired flow rate, but also contain enough mass of material to enable desired levels of contaminant reduction, while having enough physical integrity to prevent the structural elements the textile material is made of from being dislodged by the water penetrating through it.

By way of non-limiting example, a textile material employed as filter media may have properties as shown in Table 1 below.

TABLE 1

| Property | Specification |
| --- | --- |
| Basis Weight | 25-200 g/m² |
| Thickness | 0.5-5.0 mm |
| Iodine Number | 500-3000 mg/g |
| Pore size distribution (avg.) | 5-1000 μm |
| Fiber diameter (avg.) | 1-50 μm |

Exemplary textile materials may have a thickness from about 0.5 mm to about 2 mm (e.g., about 0.75 mm to about 1 mm). The fibers of the textile material may have any suitable diameter, e.g., from about 0.1 nm to about 50 nm, from 0.1 to about 20 nm, etc. It is believed that the fibrous characteristics of the textile material from which the filter media is formed may be at least in part responsible for the relatively high flow rates. Such characteristics are believed to exhibit higher ratios of surface area to volume than possible with filter media foam substrates, providing superior filtration effectiveness characteristics than possible with a single pass through a typical foam filter media material. For example, the efficiency available with a foam filter media (e.g., such as that employed in the CAMELBAK RELAY) may be only about ⅓ that provided by granulated activated carbon filter media, under typical use conditions. Such textile materials also provide lower flow resistance than available when using granulated activated carbon filter media, making possible the desired relatively high flow rates. Thus, the described textile materials arranged as described herein provide for relatively high flow rates and relatively high rates of effectiveness in contaminant removal.

For example, such foam filter systems are not particularly efficient in removing chlorine or other contaminants, as relatively more foam material is required to achieve a desired target removal efficiency. The activated carbon textile materials as employed herein advantageously are capable of achieving contaminant removal efficiencies (e.g., at least 80%, at least 85%, at least 90%, at least 95%, or at least 99% chlorine removal) comparable to that achieved by products employing monolithic or granulated activated carbon filter media, but at flow rates that are significantly higher than provided with granulated or monolithic activated carbon, and that are relatively small in size, making practical the implementation of a filter-as-you-pour container system.

Stated another way, the filter-as-you-pour systems of the present invention employ a textile filter media material arranged so as to present a curved surface to inflowing water to be filtered. The configurations allow for relatively compact filter assemblies capable of providing performance equivalent or similar to larger (e.g., greater surface area of filter media) or multi-stage systems. The filter-as-you-pour system places textile filter media material in the path of water flowing out from the container body under gravity-flow conditions. Under such conditions, with a known porous filter material constant bulk density, Darcy's law applies:

$$k = \frac{QL\mu}{\rho g A \Delta P}$$

| Symbol | Variable | Typical Units Metric (English) | Typical Operating Range |
| --- | --- | --- | --- |
| k | Intrinsic Permeability | cm/s (ft/s) | 1.2 × 10⁻⁷-3.7 × 10⁻⁴ (4 × 10⁻⁹-1.2 × 10⁻⁵) |
| Q | Flow Rate | L/min (gal/min) | 0.75-7.5 (0.2-2.0) |
| L | Path Length | cm (in) | 0.1-0.5 (0.04-0.2) |
| μ | Dynamic Viscosity | g/cm-s (lbf/ft-s) | 0.9-1.4 (0.06-0. |
| ρ | Fluid Density | g/cm³ (lb/ft³) | 1.00 (62.4) |
| G | Gravity Acceleration | cm/s² (ft/s²) | 980.665 (32.174) |
| A | Surface Area | cm2 (ft²) | 50-650 (0.05-0.60) |
| ΔP | Pressure Differential | cm H₂O (lb/in²) | 5-15 (0.07-0.22) |

Figure 7:
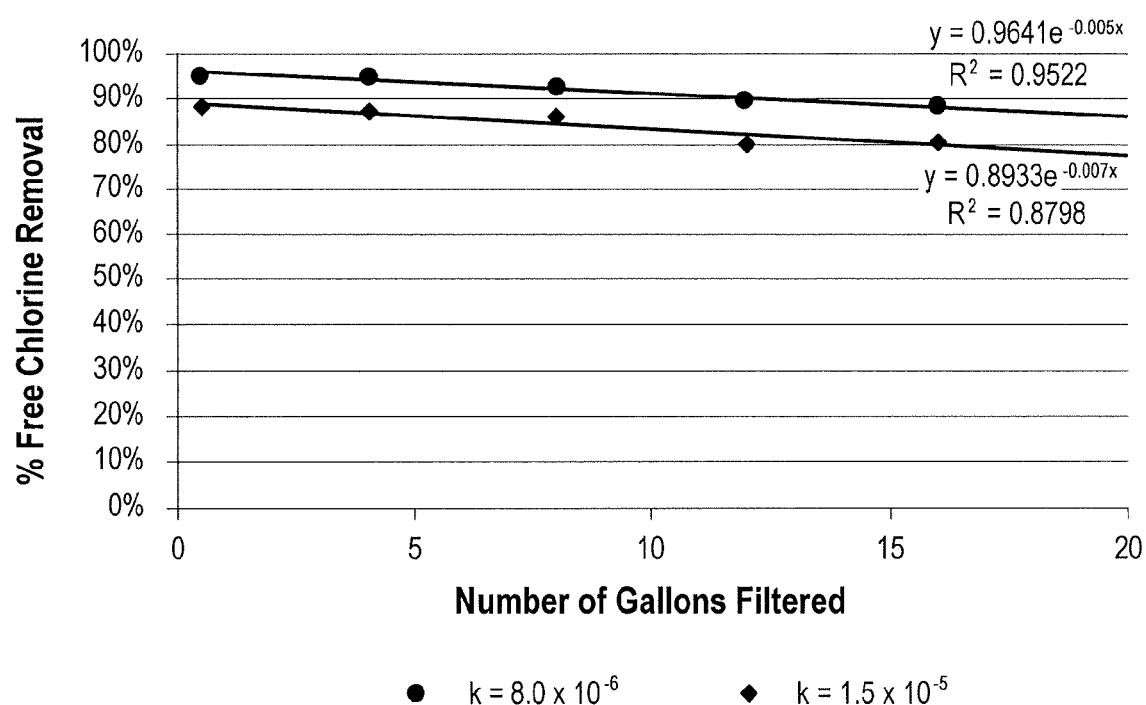
FIG. 7 is a graph illustrating how free chlorine removal may decrease with increasing throughput.

For a given filter material density and associated permeability, the removal efficiency for a given water contaminant (e.g., chlorine) can be related directly to the mass load of that constituent over time. For a constant influent concentration (e.g., the unfiltered water all includes the same chlorine concentration), removal efficiency can be related to total flow throughput. For a first-order reaction, such as that characteristic of free chlorine degradation or adsorption on activated carbon, this follows an exponential curve. As permeability increases, contaminant removal decreases. The filter-as-you-pour configuration and textile filter media material described has the advantage of providing higher contaminant removal efficiency at higher permeability than alternative methods. Because of these advantages, this allows relatively smaller filtration assemblies, and/or better removal efficiencies. FIG. 7 illustrates exemplary contaminant removal profiles for two different permeability values over a portion of the life of a filter assembly.

Such filter assemblies may have a life of at least about 20 gallons, at least about 30 gallons, at least about 40 gallons, from about 40 to about 80 gallons, etc. At the end of its life the filter assembly may still achieve chlorine removal of at least 60%, at least 70%, or at least 75%. The filter assemblies may meet applicable NSF/AISI 42 standards. As shown in FIG. 7, the contaminant removal efficiency may be relatively consistent over the life of the filter assembly (e.g., within ±30%, within ±25%, within ±20%, within ±10%, or within ±5% of a lifetime average removal efficiency.

FIG. 3A illustrates an exploded view of filter assembly 124. The textile material 126 may comprise one or more layers that are wrapped around a core frame member 128 of the filter assembly 124, so that the flexible, fibrous textile material presents a curved surface to water entering the filter assembly 124. Filter assembly 124 is shown (FIG. 1) as being mounted generally vertically within storage volume 104 (e.g., attached to lid 110). A casing or shell 136 may be disposed about core frame member 128, sandwiching textile material 126 between shell 136 and core frame member 128. As shown, shell 136 may include slots 138 disposed therein, so as to allow water that is to be filtered by filter assembly 124 to enter.

FIG. 2 illustrates an exemplary flow path along which the water may pass as it moves through system 100, including filter assembly 124. For example, water may be introduced into container body 102 through inlet 112 in lid 110, as depicted by arrow A. As shown, advantageously, no filter may be disposed between inlet 112 and storage volume 104, so that unfiltered water may be quickly introduced into container body 102, without any delay associated with a filter disposed between inlet 112 and storage volume 104. Rather than filtering upon entering container body 102, at least some embodiments of the present invention provide for filtering of the water only as it exits through outlet 108. Of course, some embodiments may provide filtering upon entrance and exit, if desired (e.g., where the inlet and the outlet are one and the same). FIG. 4B, described below, illustrates one such embodiment.

When tipping pitcher or other container body 102 (e.g., as depicted in FIG. 2), the water may flow along a radial flow path B, through one or more layers of fibrous textile filter media 126, which advantageously is disposed so as to present a curved, rather than perpendicular or planar surface to the stream of water. By positioning fibrous, textile filter media 126 so that at least a portion thereof presents a curved, rather than planar surface, the inventors have surprisingly found that flow rates through the filter media are significantly increased. Once the water passes through layer(s) 126, the filtered water may then flow axially, as represented by arrows C, up towards outlet 108. The filtered water may pass through outlet 108, and over spout portion 118 of lid 110.

In an embodiment, characteristics of textile filter media material 126 may also be adjusted to alter the flow characteristics of the stream of water exiting the system, e.g., in combination with any flow control device disposed proximate the outlet (e.g., outlet 108). For example, in an embodiment, the filter media 126 may comprise a single layer of the activated carbon textile material. In another embodiment, a second layer may be provided, so that the filter media comprises two layers of activated carbon textile material (e.g., two layers, each about 0.75 mm to about 1 mm in thickness). Similar results may be achieved by increasing the thickness of a single textile layer (e.g., about 1.5 mm to 2 mm rather than a 0.75 mm to 1 mm thick single layer). Providing two layers of textile filter media material 126 (or a thicker single layer) may reduce the flow rate of water through the system as compared to a single layer of a given thickness.

Use of two layers may also increase the filtration effectiveness characteristics (e.g., a higher fraction of removed chlorine), e.g., where the layers are configured to remove the same materials), or increase life (e.g., gallons filtered before recommended filter replacement). For example, use of two layers may flatten the chlorine removal over gallons filtered plot (see FIG. 7), providing increased consistency over the life of the filter. In addition, the second layer may be differently configured relative to the first layer, so as to remove different contaminants. For example, a second layer may comprise an ion exchange resin (IER) in fibrous, textile form, so as to be disposed within filter assembly 124 in a similar manner as the activated carbon textile material 126, but capable of removing heavy metal contaminants (e.g., copper, cadmium, mercury, lead, etc.).

The activated carbon textile material 126 is fibrous, e.g., so that fibers, filaments, or other structural elements of the material may be matted, woven, braided, or otherwise joined together. Such a fibrous material exhibits very high porosity characteristics, allowing and providing for the relatively high flow rates of water therethrough, as described herein. Such porosity and associated flowrate characteristics are not possible with traditionally employed filter media, such as monolithic activated carbon block, or a bed of activated carbon granules or particles. Although filtering foam filter media may offer gravity fed flow rates therethrough that are higher than those possible with granulated or monolithic activated carbon, it does not provide as high a degree of contaminant removal with a single pass as provided by monolithic or granulated activated carbon (e.g., about 99% chlorine removal), under typical use conditions. In other words, such foam filter systems are not particularly efficient in removing chlorine or other contaminants. For example, foam filter media (e.g., such as that employed in the CAM-BELBAK RELAY) may remove only about ⅓ as much chlorine in a single pass under typical use conditions. As a result, products relying on filtration using a foam filter media may typically pass the water through the foam filter media both upon entry and exit from the container in order to achieve an acceptable level of contaminant removal efficacy. Even after two such passes, the level of chlorine removal may be less than that provided by granulated or block activated carbon filter media.

Employing the fibrous activated carbon textile material as described herein advantageously is capable of achieving contaminant removal efficacy (e.g., at least 80%, at least 85%, at least 90%, at least 95%, or at least 99% chlorine removal) that is comparable to that achieved by products employing monolithic or granulated activated carbon filter media (e.g., about 3 times greater than that provided by foam), but at flow rates that are significantly higher (e.g., at least about 0.3 GPM) than granulated activated carbon, which makes practical implementation of a filter-as-you-pour container system possible. For example, such percentages as described above of the chlorine present (e.g., as added to typical residential drinking supplies) may be removed by the textile filter media 126, in a single pass. In addition, other contaminants (e.g., heavy metals) may be removed where the filter assembly further comprises an ion exchange resin (IER) section. For example, such an IER section may comprise a second layer of textile material, or may be disposed in the central hollow core defined by frame member 128 (see FIG. 3A).

Figure 3B:
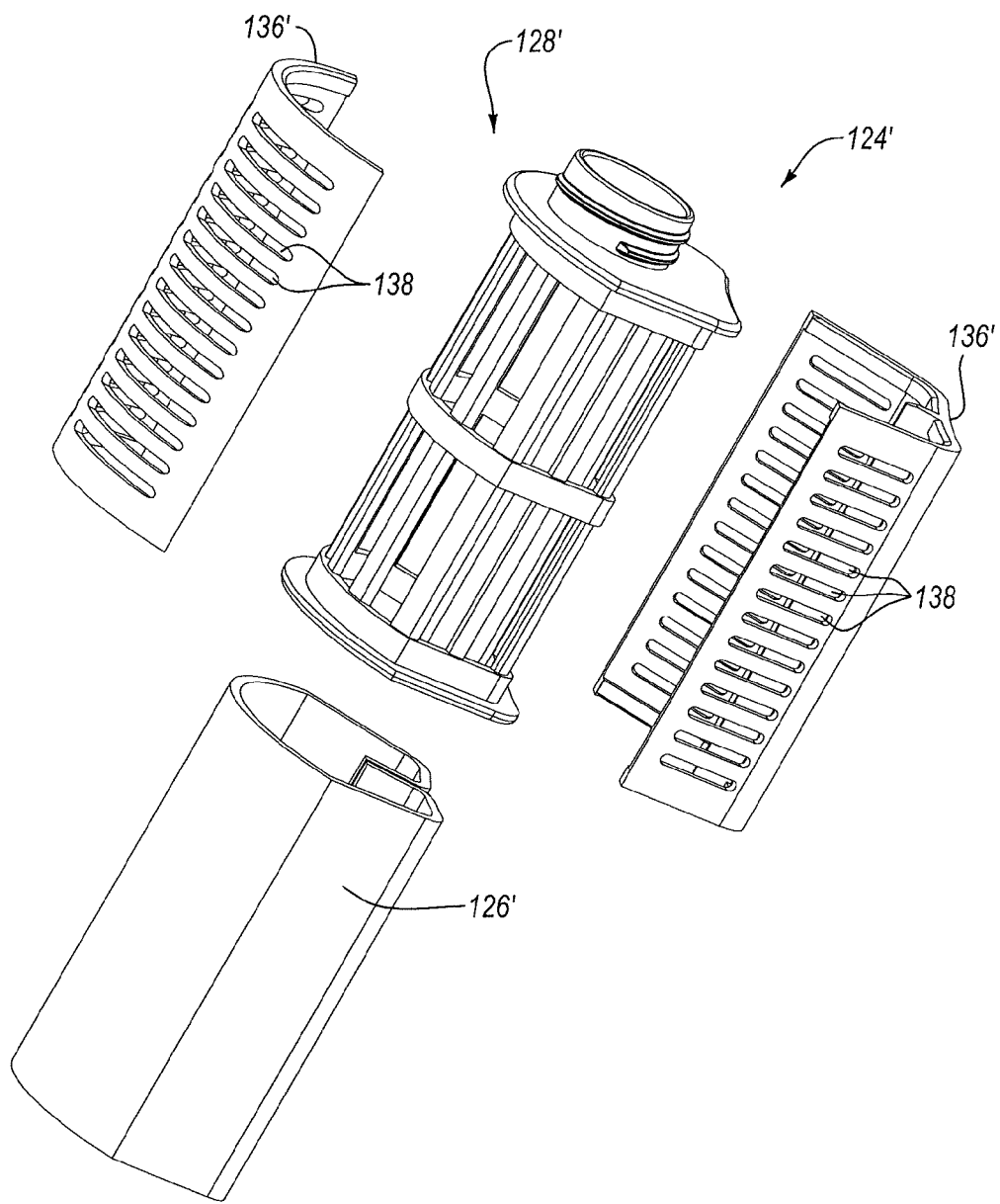
FIG. 3B is an exploded perspective view of another exemplary filter assembly suitable for use with the present invention.
Figure 4A:
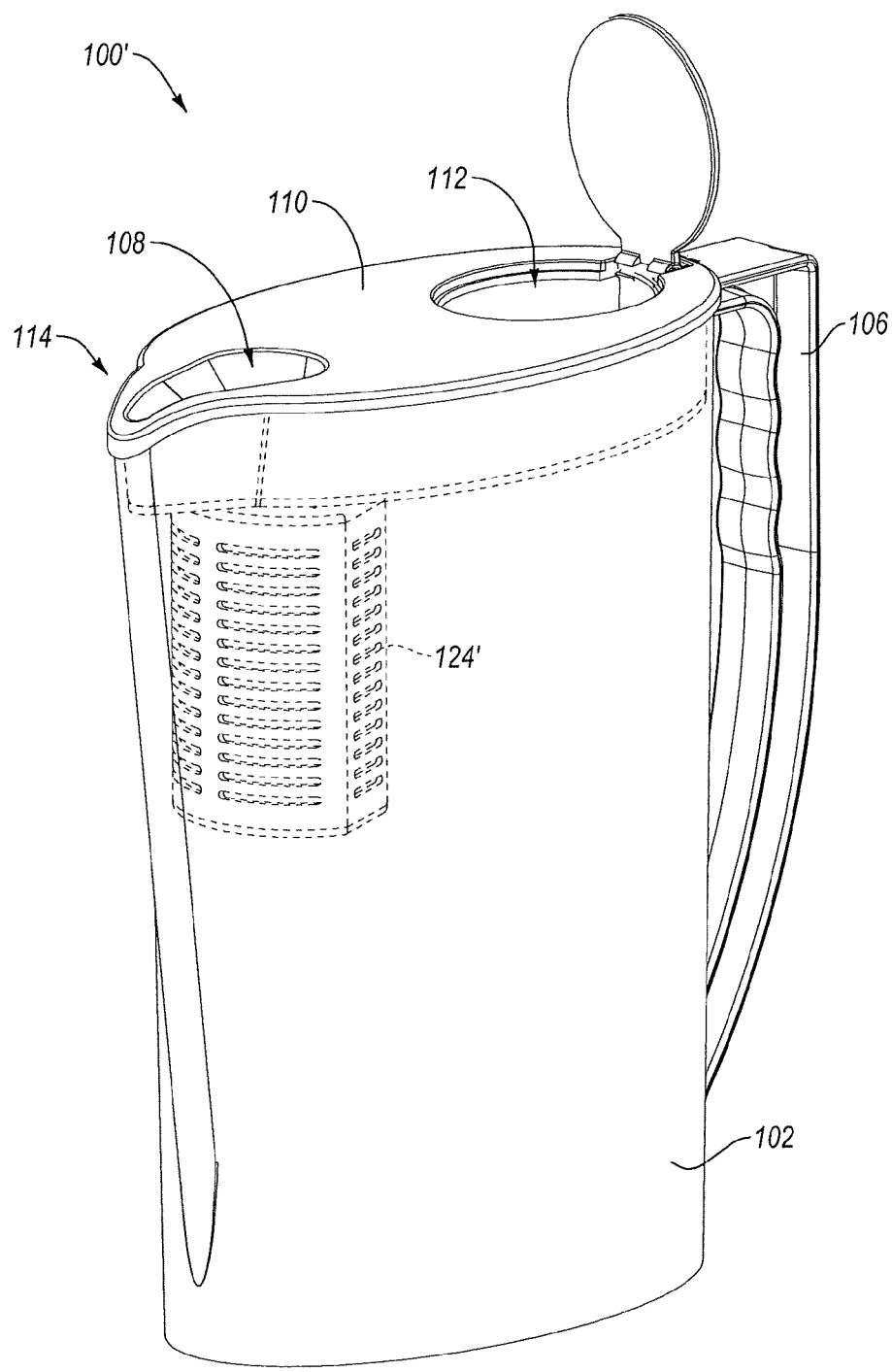
FIG. 4A is a perspective view of another exemplary pitcher system similar to that of FIG. 1, but employing the filter assembly of FIG. 3B.
Figure 4B:
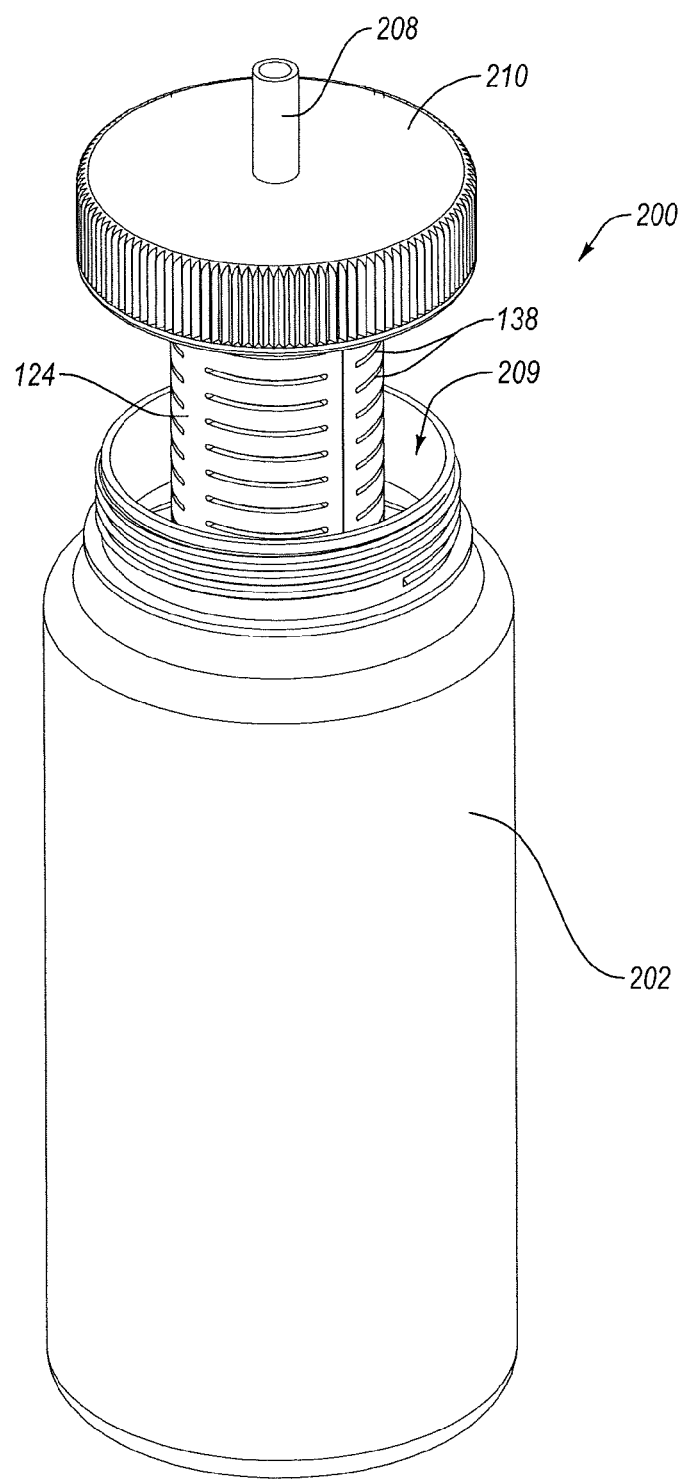
FIG. 4B is an exploded perspective view of another exemplary container system, showing an embodiment with a combined inlet and outlet, which can filter the water upon both entry and exit.

FIG. 3B illustrates another filter assembly configuration 124', where the front face of filter assembly 124' is curved, and FIG. 4A shows an exemplary system 100' including filter assembly 124'. Such a filter assembly 124' includes a transverse cross-section that is generally 4-sided, wherein the front side of the quadrilateral is crescent shaped, providing the desired curved surface. System 100' may be otherwise similar to system 100 of FIG. 1, including a core frame 128' about which textile filter media material 126' is wrapped, with casing or shell portions 136' disposed there over. It will be readily apparent that various filter assembly configurations may be employed. Additional details of exemplary filter assemblies, filter media and filter housings are disclosed in U.S. patent applications bearing Ser. No. 14/569,397; Ser. No. 15/038,996; and Ser. No. 15/038,998, each filed the same day as the present application and each herein incorporated by reference in its entirety.

FIG. 4B illustrates an embodiment of a system 200 including a lid 210, a container body 202, and a filter assembly 124, where filtering may be achieved both upon entry and upon exit. Filter assembly 124 may be similar or identical to the cylindrical filter assembly 124 shown in FIGS. 1-3A. Rather than including separate inlets and outlets, system 200 includes a single combined inlet and outlet 208. Lid 210 and the top of container body 202 may collectively comprise a mating thread and groove attachment mechanism by which lid 210 is releasably attachable over container body 202. Filter assembly 124 may be releasably attached into the underside of lid 210, by a mechanism similar to the threaded attachment shown and described above in conjunction with FIGS. 1-3A.

As a combined inlet and outlet 208 is provided, water may be filtered both on entry and on exit to and from container body 202. For example, water may be introduced through opening 208, along a flow path that is opposite that shown in FIG. 2. For example, the introduced water may flow downward (e.g., in a direction opposite arrows C of FIG. 2). This portion of the flow path may be axial relative to the longitudinal axis of filter assembly 124. The water may then flow in a direction opposite that of arrows B, through the textile filter media material 126, exiting slots 138. This portion of the flow path may be radial relative to the longitudinal axis of filter assembly 124. Having passed through filter assembly 124 once, and now in container body 202, the flow path of the water upon exiting through combined inlet and outlet 208 may be opposite to that just described—i.e., the same flow path as described above in conjunction with FIG. 2. In other words, during exit, the flow path may initially be radial as the water penetrates through textile filter media material 126 (which is curved relative to the penetrating water), as represented by arrows B. The flow within the central portion of filter assembly 124 may then be axial, as represented by arrows C as the water progresses towards and out combined inlet and outlet 208.

Of course, one may remove the lid 210 when filling container body 202, so as to filter only upon pouring (i.e., water enters directly into the open top 209 of container body 202, without passing through combined inlet and outlet 208). Similarly, one may filter upon entrance, and then remove the lid 210 and drink or otherwise pour the filtered water within container body 202, without having it pass again through the combined inlet and outlet 208.

Figure 5A:
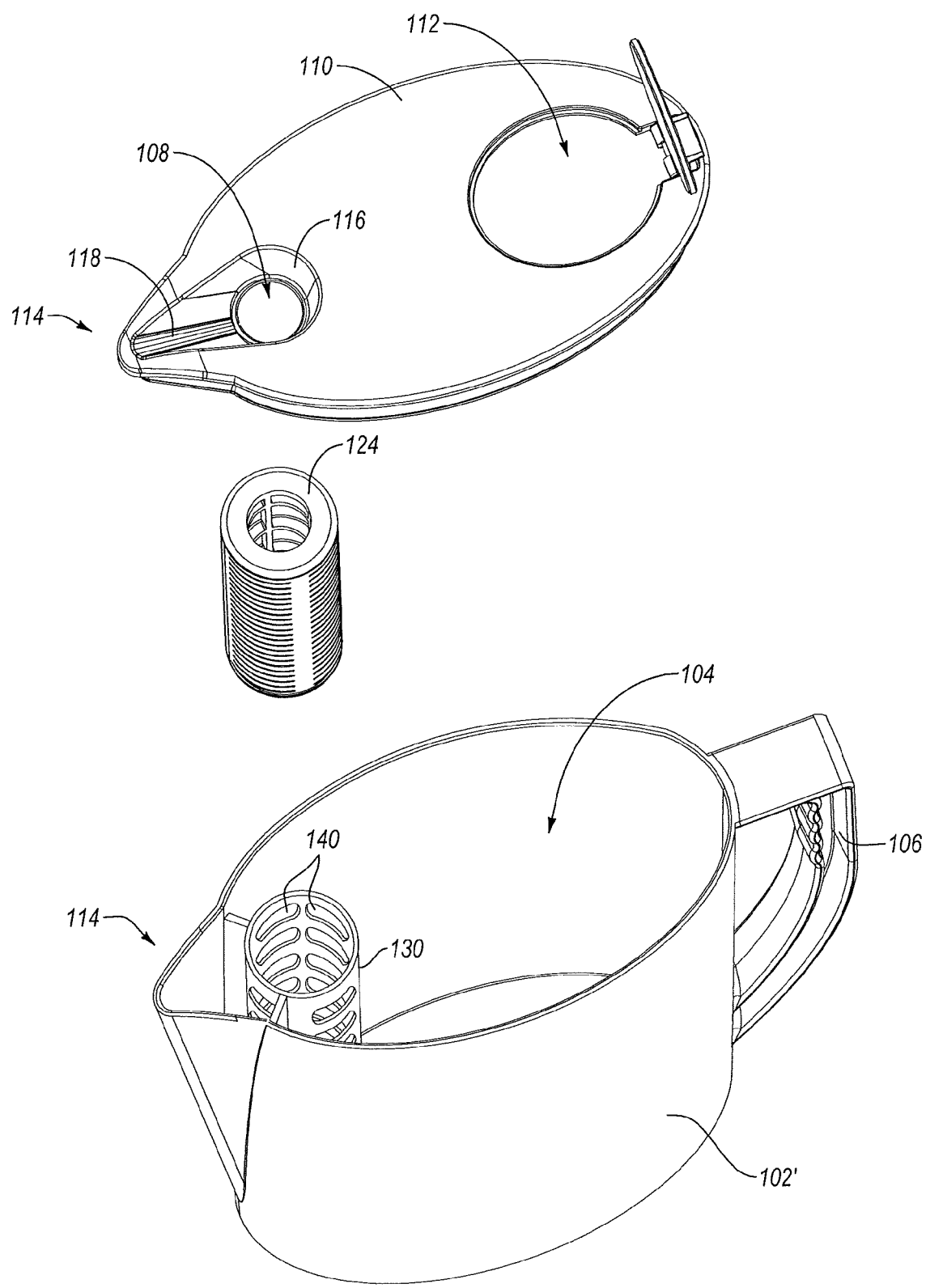
FIGS. 5A-5B are exploded views showing yet another exemplary pitcher system, where the filter assembly is attached to the pitcher body, rather than the lid.
Figure 5B:
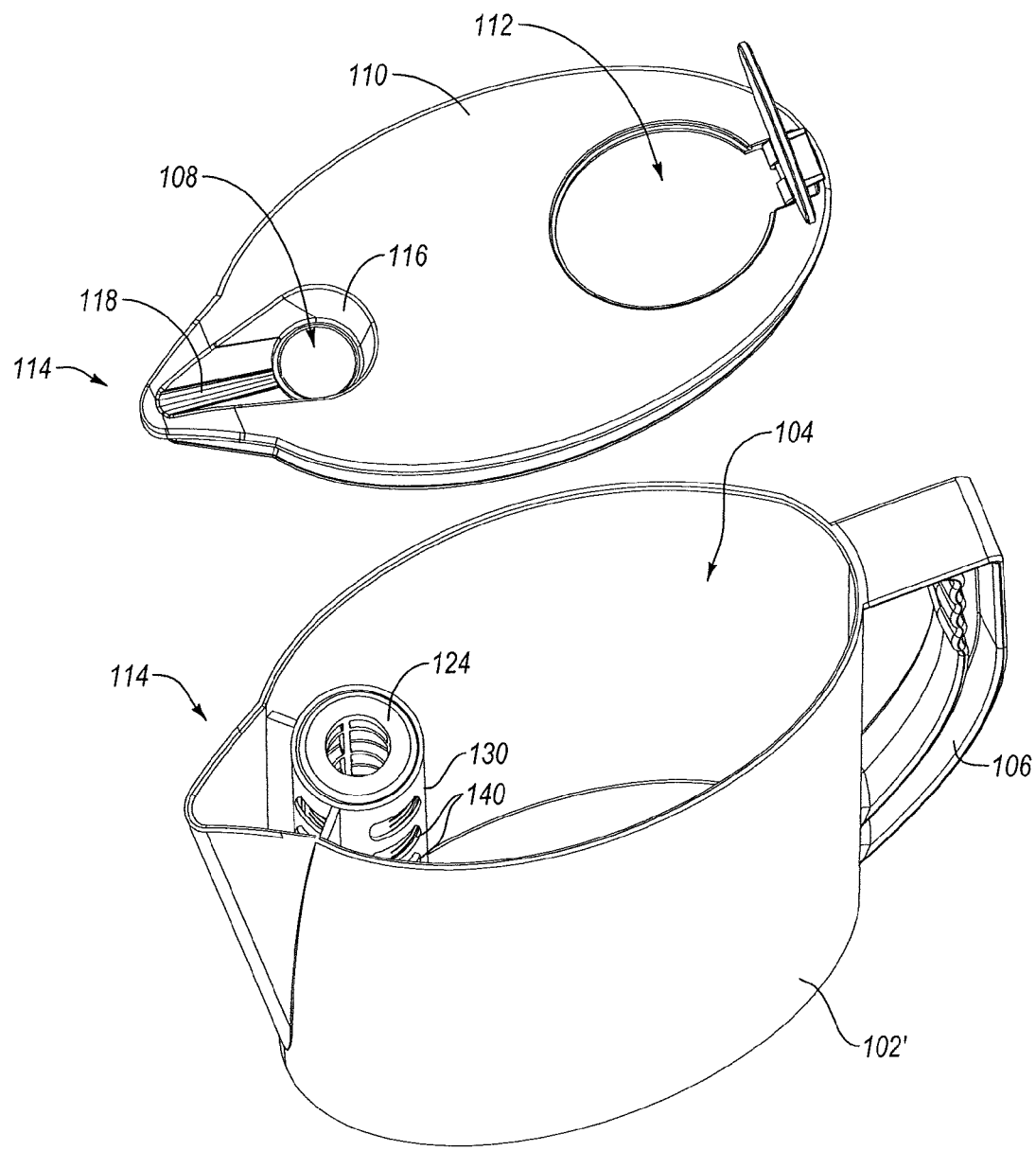
Figure 5C:
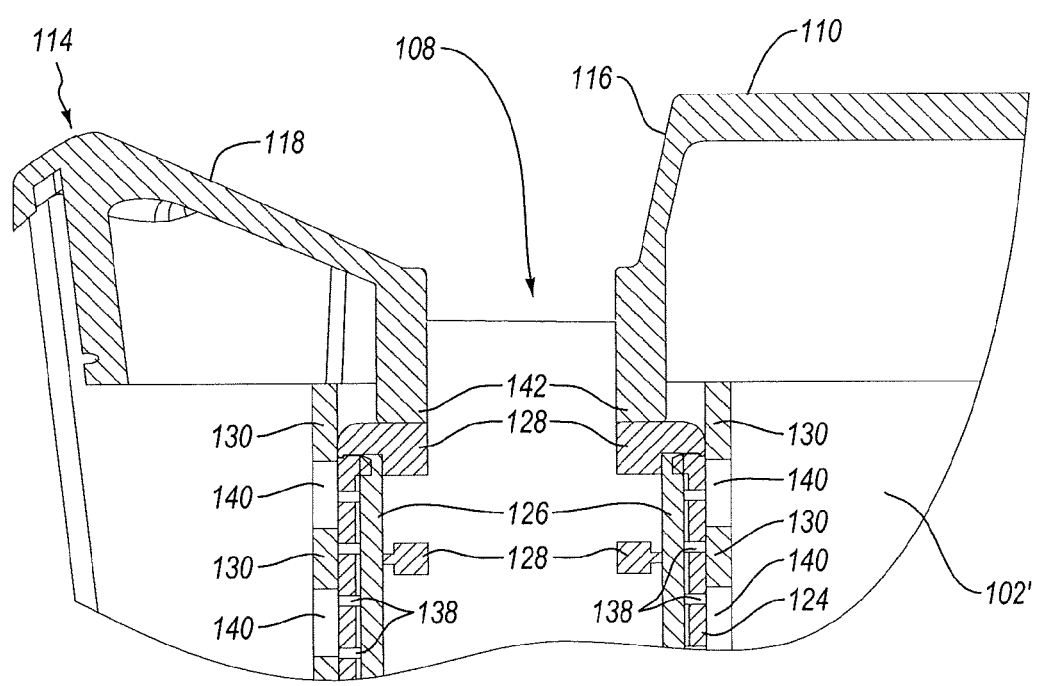
FIG. 5C is a cross-sectional view through a portion of the system of FIGS. 5A-5B, showing the filter assembly captured within and between the receptacle of the pitcher body and the lid placed over the pitcher body.

The filter assemblies 124 and 124' of FIGS. 1, 4A, and 4B are shown as attached to lid 110 or lid 210 (e.g., through any suitable releasable attachment mechanism, such as the illustrated threaded connection, a friction fit, etc.). In another embodiment, the filter assembly may be releasably attached or disposed within structure of the container body of the system. FIGS. 5A-5C illustrate such an exemplary configuration, where container body 102' may include a receptacle 130 into which the filter assembly (e.g., assembly 124) may be received. Receptacle 130 of container body 102' may include slots 140 disposed therein to allow water within storage volume 104 to pass through the wall of receptacle 130, into slots 138 of filter assembly 124. Water may flow through filter assembly 124 in a similar manner as described in conjunction with FIG. 2.

In an embodiment, the filter assembly is elongate and generally vertically oriented relative to the lid (e.g., lid 110 or 210) when horizontal (e.g., as depicted in FIG. 1, 4A or 4B). In an embodiment, the filter assembly may be generally cylindrical, with the textile material 126 arranged in a generally cylindrical shape, such as depicted in FIG. 3A. In an embodiment, the filter assembly, the cylindrical shape of the textile material 126, or both, may have a length to width ratio of at least 1:1, at least 2:1, or at least 3:1 (e.g., about 2:1 to about 4:1). For example, in an embodiment, the length of the filter assembly may be about 110 mm, and the diameter, about 36 mm (e.g., providing a ratio of length to width of about 3:1). The crescent shaped filter assembly of FIG. 3B may have similar length to width ratios, as described in U.S. patent applications bearing Ser. No. 14/569,397; Ser. No. 15/038,996; and Ser. No. 15/038,998, already incorporated by reference.

As seen in FIGS. 5B and 5C, filter assembly 124 may drop down into receptacle 130, and be retained therein once lid 110 is placed over the open top of container body 102'. Outlet 108 through lid 110 may be axially aligned with the longitudinal axis of generally vertical cylindrical filter assembly 124, so that water within the hollow central core of assembly 124 flows axially upward, towards outlet 108. A seal or other barrier may be provided between the top of receptacle 130 and the bottom of outlet 108 to minimize any risk of bypass, by which water could exit through outlet 108 without first passing through filter assembly 124. FIG. 5C illustrates such a feature, as a sealing extension 142 which extends downwardly from outlet 108, into or about the top of receptacle 130. Such an extension may press against the top of assembly 124 and/or receptacle 130, so as to also minimize or prevent axial translation of assembly 124 within receptacle 130, which may otherwise occur where assembly 124 is merely trapped rather than directly attached to the lid or container body. Of course, in an embodiment, assembly 124 could also screw into or otherwise releasably attach to lid 110. Similarly, assembly 124 could screw into or otherwise releasably attach to receptacle 130 (e.g., the bottom of receptacle 130), if desired.

Figure 6A:
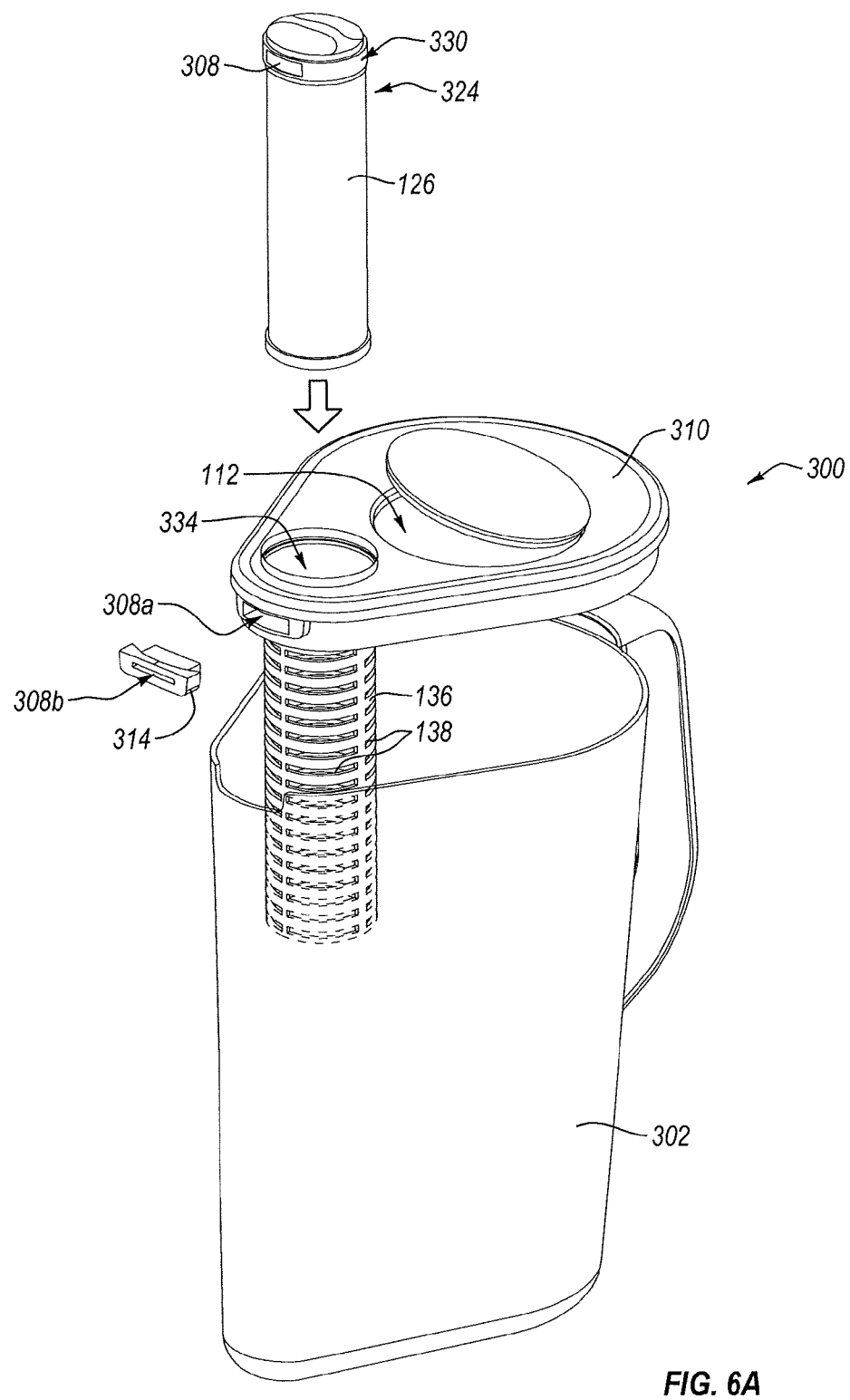
FIG. 6A is an exploded perspective view illustrating another exemplary embodiment of a filter-as-you-pour system.
Figure 6B:
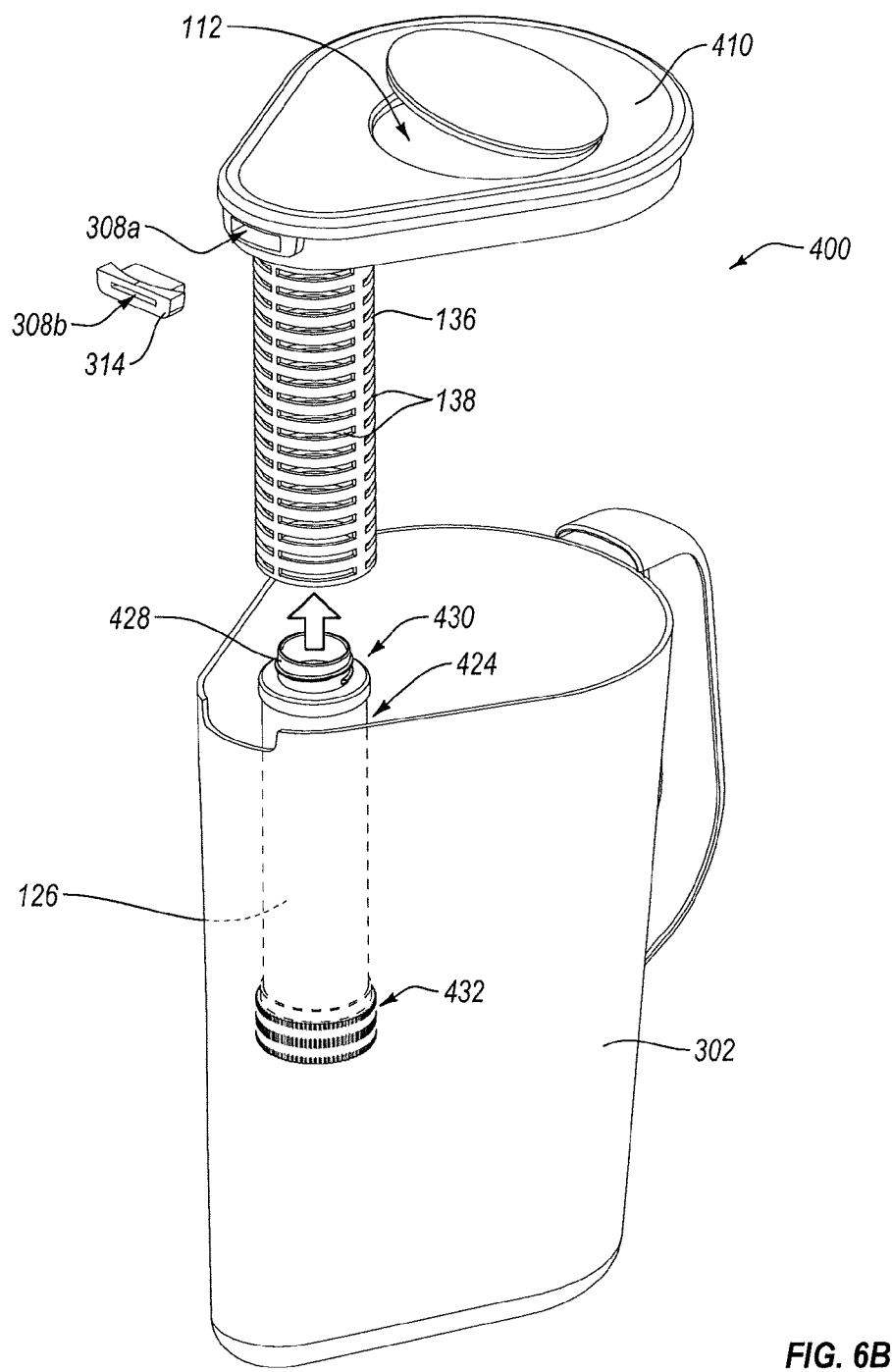
FIG. 6B is an exploded perspective view illustrating another exemplary embodiment of a filter-as-you-pour system.
Figure 6C:
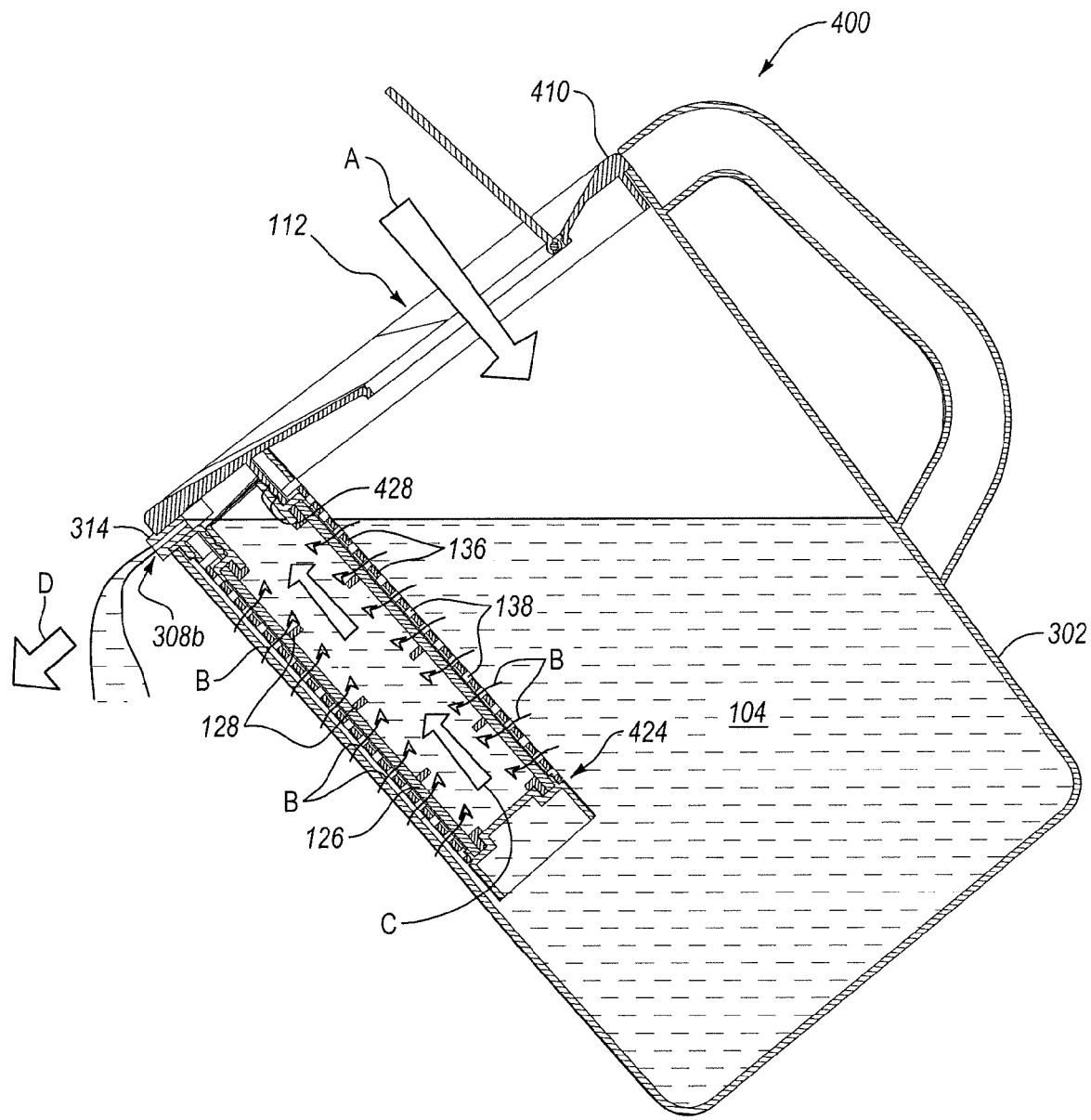
FIG. 6C is a cross-sectional schematic view through an assembled filter-as-you-pour system similar to that of FIG. 4B, showing the flow of water in and out of the system.

FIGS. 6A-6B illustrate an exemplary configuration where the filter assembly may be inserted from the top down, or from the bottom up, respectively. Both configurations shown in FIGS. 6A-6B include a particular lid and spout configuration that permit exiting water to flow out of the system in a direction that is radial relative to the filter assembly. FIG. 6C illustrates a cross-section through the system of FIG. 6B.

As seen in FIG. 6A, a system 300 may include a container body 302, a lid body 310, and a filter assembly 324, which may be inserted from the top down (e.g., dropped down) into casing or shell 136, which includes slots 138. Filter assembly 324 may be trapped between a bottom of casing or shell 136 and lid body 310, upon insertion therein. For example, a top end of filter assembly 324 may snap into or otherwise be secured into lid body 310. A top end of shell 136 may be threaded, snapped, or similarly secured into lid body 310. In another embodiment, the filter assembly 324 could be screwed or similarly secured (e.g., snapped) into a bottom of shell 136, etc. An opening 334 not for exit of filtered water, but for insertion of filter assembly 324 may be provided (e.g., towards the forward end of) in lid body 310. Opening 334 is plugged or sealed upon insertion of filter assembly 324 into shell 136.

Filter assembly 324 may be similar to assembly 124 of FIG. 3A, e.g., including a core about which textile filter media material 126 is wrapped, providing a generally cylindrical shape. The top end 330 of filter assembly 324 may be somewhat differently configured than assembly 124, e.g., so as to provide for exit of filtered water in a radial or lateral direction, rather than coaxial with the longitudinal axis of the filter assembly 324. For example, within the interior of filter assembly 324, the top end 330 may be closed, while outlet 308 for exiting filtered water may be provided in a lateral side of top end 330 of filter assembly 324. A corresponding outlet portion 308a may also be provided in lid body 310, in-line with outlet 308 of filter assembly 324. So that filtered water exiting filter assembly 324 through outlet 308 then enters outlet portion 308a of lid body 310. A spout 314 may be inserted including another outlet portion 308b may be inserted and retained within outlet portion 308a, so that filtered water exiting outlet 308 flows through outlet portions 308a and 308b, then exiting the system 300.

Spout 314 may be configured (e.g., in cross-sectional area, other geometric characteristics, etc.) to serve as a flow control device, to regulate flow out of system 300 to a desired flow rate, as described herein. Spout 314 may redirect filtered water flow exiting axially from the filter assembly, and may control and ensure water exits along a guided flow path. The interior pathway defined by spout 314 (e.g., outlet 308, 308a, and to 308b) may be tapered in cross-sectional area and/or width, narrowing towards exit 308b. Such a spout 314 has been found to be helpful in providing consistent flow rates over the volume of water dispensed by the container body (e.g., so that the flow rate when dispensing the first cup from a full container is substantially equal to the flow rate when dispensing the last cup from a nearly empty container. For example, flow rates may be within ±30%, ±25%, ±20%, ±10%, or ±5%, over the entire volume of the container. Additional details of such flow regulation are described in Ser. No. 15/039,002, already incorporated by reference.

FIG. 6B illustrates a similar system 400 including a lid body 410 to which shell 136 may be secured. In the embodiment seen in FIG. 6B, filter assembly 424 may also be similarly configured to filter assembly 124, e.g., including a core about which textile filter media material 126 is wrapped, providing a generally cylindrical shape. Rather than being inserted from above as in FIG. 6A, the filter assembly 424 may be inserted into shell 136 from below. As shown, a top end 430 of filter assembly 424 may include threads 428 for threading filter cartridge 424 into corresponding grooves of lid body 410. Alternatively, top end 430 could snap into lid body 410. The bottom end 432 of filter assembly 424 may be provided with a ribbed outer surface to facilitate screwing of filter assembly 424 into lid body 410.

A spout 314 similar to that described in conjunction with FIG. 6A may also be provided, inserted within an outlet portion 308a in lid body 410, so that water exits system 400 through outlet 308b in a direction that is radial or lateral relative to the longitudinal axis of filter assembly 424 received within shell 136. For example, both FIGS. 6A and 6B illustrate configurations in which the water enters through an inlet 112 in a top of the lid body, but in which water exits the system in a lateral, perpendicular direction, rotated about 90° relative to inlet 112, rather than exhibiting an inlet and outlet that are parallel to one another (e.g., inlet 112 and outlet 108 of FIG. 1 are parallel to one another, while inlet 112 and outlet 308b of FIGS. 6A-6B are perpendicular to one another).

FIG. 6C shows a cross-sectional view through the assembled system 400 of FIG. 6B illustrating an exemplary flow path, similar to that shown in FIG. 2. The system 300 of FIG. 6A may include a similar flow path as that shown in FIG. 6C. As shown, unfiltered water may be introduced into container body 302 through inlet 112 (arrow A), flow into filter assembly 424 along a radial flow path as depicted by arrows B, through one or more layers of textile material filter media 126, which advantageously is disposed so as to present a curved, rather than perpendicular or planar surface to the stream of water. Once the water passes through layer(s) 126, the filtered water may then flow axially, as represented by arrows C, up towards outlet 308b. In order to exit outlet 308b, the filtered water is again turned, flowing laterally outward (arrow D). Before finally exiting outlet 308b, the filtered water may pass through any additional flow control device (e.g., a slit valve, grating, etc.) disposed adjacent the outlet.

E. Aspects of Some Example Additives

As noted earlier, one or more additives can be included in any of the FAYP embodiments disclosed herein, and/or other fluid dispensing systems, whether or not those other fluid dispensing systems are disclosed herein. In some particular embodiments, the additives can take various forms and may be positioned in a filter cartridge so that the additive is introduced to filtered water as the filtered water is dispensed from a container. Other example embodiments are directed to the addition of additives to water through the filter from a pitcher, faucet apparatus and/or water bottle. Still other additive delivery systems are configured to be attached to the pitcher, faucet and water bottles containing filters.

Additives within the scope of this disclosure can take a variety of forms. Thus, additives can be liquid, or solid, or a combination of liquid and solid. As well, some embodiments employ combinations of additives that are in the same form, while other embodiments employ combinations of additives that are in different respective forms. In general, the additives are chemical compositions that produce a relatively concentrated liquid layer that contacts, and mixes with, filtered water. The concentrated liquid layer can be generated by dissolution of an additive that is initially in a solid form, or the concentrated liquid layer can comprise or consist of a volume of concentrated additive that is initially in a liquid form.

Where the additive takes a solid form, the configuration or shape of the solid form is such as to enable generation of a concentrated liquid layer that is held by, or has an affinity for, the remaining solid portion of the additive. As a result of this configuration, the solid additive can slowly dissolve into a flowing stream of water, such as filtered water. The dissolution rate of the additive, whether in solid or liquid form, can generally be controlled by limiting the extent to which the liquid layer of additive interacts with the filtered water. For example, a capillary or similar device can be used to control dissolution in embodiments where the liquid additive is aspirated. As another example, one or more binders and/or inhibitors can be mixed with the solid form additive to control dissolution of the additive.

In still other embodiments, a solid form additive includes a portion which transforms, initially at least, into a gel when exposed to water. In this example, a surface of the solid form, which could be a tablet or film for example, is wetted by a fluid such as filtered water and a surface concentrated gel layer forms in the wetted region. As the stream of water continues to flow, the concentrated additive in the gel layer is dissolved and enters the fluid stream. The additive concentration in the fluid stream can be determined by a variety of factors, including the depth of the gel layer, fluid flow rate, rate of dissolution of the gel layer, and volume of collected aliquot. This embodiment of the solid form additive can be used in a variety of applications, one example of which is a filter as you pour pitcher.

Additives can be employed for a variety of reasons. For example, some additives may add flavoring to the filtered water. Other additives may add color to the filtered water. Still other additives may introduce nutritional items such as vitamins or minerals into the filtered water. Further additives may introduce other properties into the filtered water that can be sensed by a user, such as carbonation for example. Additives employed in embodiments of the invention can include any combination of the aforementioned example properties or characteristics. The scope of the invention is considered to be broad and, as such, is not limited to the examples disclosed herein. Below are some examples of additives that can be employed in various embodiments of the invention.

Such additives can include actives such as vitamins, minerals, amino acids, tea extracts, antioxidants, natural extracts, chlorophyll, soluble fibers, fruit and vegetable extracts, flavors, flavors enhancers and flavors modifiers, polyphenols (resveratrol, Naturex), anthocynaidins, terpenes, stimulants (caffeine, guarana), fenugreek, trace nutrients, pH control agents, DHEA, encapsulated lipids, lipids, micro-emulsions or nano-emulsions, and probiotics, and any combination of one or more of the foregoing. The active range varies according to additive.

Example tablets within the scope of the invention can include any combination of one or more of 1) health enhancers, 2) binders—which may be hydrophobic or hydrophilic, 3) mold release agent, 4) lubricants, 5) coatings to prevent oxidation like in vitamin C, 6) flavors, 7) colors, 8) antioxidants 9) flavors enhancers or modifiers like anti-bitter agents, 10) sweeteners, 11) fillers like malto-dextran, 12) thickeners, 13) emulsifiers, 14) water, 15) solvents, and, 16) antimicrobials.

As noted above, some additives take the form of health enhancers. Example health enhancers include, but are not limited to: minerals and trace elements (including calcium, magnesium, iron, zinc, manganese, copper, chromium, selenium, molybdenum, vanadium, potassium, iodine, and boron); vitamins (including Vitamin A, all B complex (vitamin B2, pantothenic acid, vitamin B6, vitamin B12, folic acid, thiamine, and niacin) vitamin C, vitamins E, D, and K, omega-3, omega-6, and omega-9 fatty acids); herbal materials (including *echinacea*, primrose oil, *ginseng*, ginko, gentian, acai, various teas like chamomile, hibiscus and mate); supplements (including comfrey, garlic, calendula, brewer's yeast, caffeine, fenugreek, licorice root, juniper berry, wild yam root, ginger root, goldenseal root, poke root, St. John's wort, mullein, saw palmetto, phytonutrients, *chlorella*, and *spirulina*); probiotics (including *Lactobacillus acidophilus*, *bifobacterium*, and *bifidium*); homeopathic remedies (including *arnica montana*, *aconitum napellus*, *bryonia alba*, *cantharis*, *cocculus*, *indicus*, *dulcamara*, *gelsemium*, *sempervirens*, *ignatia amara*, *ledum palustre*, *mezereum*, *nux vomica*, *silicea*, and *thuja occidentalis*); and amino acids (including histidine, isoleucine, leucine, lysine, methionine, cysteine, phenylalanine, tyrosine, threonine, tryptophan, valine and MSG).

As well, a range of nutrients recognized in super fruit, vegetables, tea, vitamins, and antioxidants can be used as additives in embodiments of the invention. For example, combinations of any one or more of the following can be used: Recognized fruit like acai or acerola, mango, gooseberry; super fruit kiwi, green tea and spinach (chlorophyll); and fruit and vegetable extracts. Such extracts can include a variety of vitamins, such as: vitamin A (carrot); vitamin C (acai, citrus); energy (yerba mate); and, vitamin K (kale, spinach, parsley). As well, some additives take the form of soluble fiber, which may have beneficial effects for the human digestive system (chicory root).

Finally, still other additives can take the form of enzymes. Some example enzymes include, but are not limited to, pancreatin, bromelain, protease, lipase, amylase, pancrelipase, papain, pepsin, diastase, cellulose, and any combination of one or more of these.

Some additional examples of additives include, but are not limited to, those listed in Appendix A hereto, which is incorporated herein in its entirety by this reference. All combinations of any one or more of the additives disclosed herein are considered to be within the scope of this disclosure.

It will be appreciated that additives, and combinations of additives, disclosed herein may be compliant with applicable Food and Drug Administration (FDA) rules. As well, use of one or more of the additives disclosed herein may support potential claims as to health benefits and/or other effects that may be achieved by ingestion of such additives. Information concerning potential benefits, claims, conditions and other information relative to the additives disclosed herein is set forth in Appendix B hereto and incorporated herein in its entirety by this reference.

As noted elsewhere herein, one or more additives can be employed in the form of a tablet or other configuration. Moreover, the characteristics of the tablet or other form can be selected depending upon various circumstances and other considerations concerning the use of the tablet. Such circumstances can include, for example, interaction between additives, additive shelf life, regulatory requirements, expected consumption rate of the additive by the liquid that is being dispensed, expected filter media life, and expected flow rates and fluid contact time with the additives.

Thus, some additives take the form of agents which may impart desired physical and/or chemical properties to the tablet or other configuration. Below is a listing of some example agents, and effects that they may provide or impart, that may be employed in various embodiments of the invention. All combinations of any one or more of the agents disclosed herein are considered to be within the scope of this disclosure.

Polydimethylsiloxane (hydrophobic modifier, disintegrant, dissolution suppressant)
Magnesium oxide (dry tablet odor reduction, dissolution suppressant)
Magnesium stearate (dissolution suppressant, tablet surface hydrophobic modifier, process aid)
Stearic acid (dissolution suppressant, tablet surface hydrophobic modifier, process aid, tablet strengthener)
Potassium stearate (did not affect dissolution, tablet surface hydrophobic modifier, process aid)
Calcium hydroxide (dissolution suppressant, tablet strengthener, tablet binder)
Talc, hydrated magnesium silicate (tablet surface texture modifier)
Hydroxyl Methyl cellulose (binder)
Methyl cellulose (binder)
Calcium phosphate, dibasic (dispersant, process aid)
Potassium phosphate, dibasic (soluble calcium sequestrate, tableting agent)
Magnesium carbonate hydroxide (binder)
Calcium carbonate (dissolution rate enhancer/disintegration aid)
Calcium sulfate (weak dissolution suppressant, solid additive carrier)
Magnesium hydroxide (weak dissolution suppressant, carbon dioxide scavenger)
Magnesium sulfate (weak dissolution suppressant)
Cellulose gum (binder)
Xanthan gum (binder)
Acacia gum (binder)
Locus bean gum (binder)
Guar gum (binder)
Sodium alginate (binder, dispersant)
Sodium bicarbonate (pH modifier)
Sodium polyacrylates (several varieties effective at calcium residue control, see accompanying information)
Arch Pulsar Briquettes with scale inhibitor (calcium encrustation prevention)
PPG Accutab tablet with scale inhibitor (calcium encrustation prevention)
Sodium chloride (calcium hypochlorite compatible solid filler and carrier)
Zeolite (calcium sequestrate, residue and calcium encrustation
Zinc oxide (insoluble tableting agent)
Sodium carbonate (dissolution suppressant, additive carrier)
Magnesium carbonate (solid dilution, active carrier)
Zinc stearate (dissolution suppressant, surface texture modifier)
Phosphoric acid (pH modifier)
Citric acid (pH modifier)
Lactic acid (pH modifier)

F. Some Example Formulations

With the foregoing discussion of additives and agents in view, attention is directed now to some example formulations that are employed in some embodiments of the invention.

One example of a liquid form formulation, which includes an active additive, stabilizer, and, optionally, a dissolution control agent is as follows: about 10% ascorbic acid (vitamin C), and about 0.2% potassium sorbate in water. Various solid form formulations can also be used. These example solid form formulations include active additive, a binder, a dissolution control agent, a stiffener, and a lubricant. Some specific solid formulations are as follows: (1) a combination including about 94.5% ascorbic acid, about 5% methyl cellulose (MC), and about 0.5% magnesium stearate (MS); (2) a combination including about 90.5% ascorbic acid, about 4% MC, about 3% hydroxypropyl methylcellulose (HPMC), about 2% hydroxypropyl cellulose (HPC), and about 0.5% MS; and, (3) a combination including about 73.5% ascorbic acid, about 15% calcium d-pantothenate (vitamin B5 equivalent), about 2.5% pyridoxine hydrochloride (vitamin B6), about 4% MC, about 3% HPMC, and about 2% SA. The aforementioned liquid and solid formulations are presented only by way of example and are not intended to limit the scope of the invention in any way.

G. Aspects of Some Example Tablets and Configurations

As noted elsewhere herein, in at least some embodiments, one or more additives are combined together to form a tablet having a donut configuration. Specifically, some example embodiments, provided here for illustrative purposes and not by way of limitation, are directed to a tablet in the form of a donut (hole in the middle) that can be employed in a system for passive delivery of water soluble additives to fluid from filtered water pitchers, faucets and on-the-go bottles containing filters. The donut configuration may be especially well suited for use in FAYP systems, although that configuration can be used in other systems as well and, further, FAYP systems may employ additives in forms other than a donut configuration.

The donut configuration, and any other forms of a tablet, can be formed by a variety of processes. For example, the tablet can be formed by processes such as wet granulation, or direct compression, so that the constituent additive(s) dissolve in a controlled manner to produce a tablet having a desired concentration, or range of concentrations, of the one or more additives that make up the tablet. The tablet may or may not be coated. In some instances, one or more additives can be combined to form a capsule.

By way of illustration, one example production process for a tablet can involve the example components and processes noted hereafter. In this particular example, a tablet includes additives such as vitamins B and C, a binder such as methyl cellulose or polyvinylpyrrolidone (PVP), a lubricant such as magnesium stearate, and water. Further details concerning this example can be found in Appendix C hereto and incorporated herein in its entirety by this reference.

With reference now to Appendix C, two different tablet embodiments are disclosed, namely, 'Tablet Type 1' and 'Tablet Type 2.' As can be seen, Tablet Type 1 is in the form of a solid disk, while Tablet Type 2 has a donut configuration that includes a hole in the middle. Below the example tablet configurations are two example test setups that can be used, for example, to test tablet lifespan and dissolution rates.

With continued reference to Appendix C, some additional examples of tablet configurations are disclosed. Turning first to example A, a configuration is shown in which a tablet includes multiple stacked layers A-1 . . . A-n, each of which may include a different additive, or combination of additives. A fluid passageway 'P' extends through all of the layers.

In example B, the tablet includes multiple concentric portions A-3 and A-4. Parameters such as the constituents and/or concentration, for example, of additives can vary between the portions, which may be generally ring-shaped. The fluid passageway 'P' extending through A-3 is gradually enlarged as the materials of that portion are eroded by, and introduced into, the flow of fluid. When A-3 is fully eroded, passage of fluid through 'P' then results in the introduction of the materials in A-4 into the fluid flow. In some cases, the concentration of additive(s) in A-4 may be relatively greater than in A-3, as in the case where the material in A-4 has lost some degree of potency over time. This approach may help to ensure relatively consistent concentration of additives introduced into the fluid, notwithstanding changes in the tablet properties over time. The change in concentration, for example, between A-3 and A-4 can be abrupt, or gradual. For example, the concentration of additives in A-3 may be the same throughout A-3 or can vary from the inside of A-3 to the outside of A-3, and these same considerations likewise apply to A-4.

Turning now to example C, it can be seen that in some embodiments at least, the fluid passageway P has other than a cylindrical form. In the particular case illustrated, the fluid passageway P has a generally conical configuration. This form, and other non-cylindrical forms, of the fluid passageway P may be employed to achieve certain effects with respect to parameters such as flow rate, additive concentration, and additive dissolution rate. As further indicated in this example, the non-cylindrical fluid passageway P can be oriented so that fluid flow proceeds from the larger diameter end to the smaller diameter end, or from the smaller diameter end to the larger diameter end.

With regard now to examples D and E, two tablet configurations are indicated that include different concentration profiles. In example D, the concentration of the additive(s) of the table is relatively lower in the center portion of the tablet but increases further away from the center portion and toward the perimeter of the tablet. Just the reverse concentration profile is indicated in example E. It should be noted that the concentration within part, or all, of a particular tablet can vary in any number of ways. For example, the concentration can vary in discrete steps, arithmetically, linearly, logarithmically, or in any other suitable fashion.

Turning next to example F, a tablet configuration is indicated where the concentration of a single additive, or multiple different additives, varies in a step-wise fashion. In particular, the first portion of the tablet has a concentration C-1, and in the second portion of the table, the concentration then steps up, or down, as the case may be, to C-2.

With reference finally to examples G, H and I, different fluid passageway P configurations are indicated. In example G, multiple fluid passageways P are provided in the tablet. In example H, a fluid passageway P is provided that has other than a circular cross-section shape, a hexagonal cross-section shape in this example, although any other polygonal shape could be used. As well, and shown in example I, the fluid passageway P can have an oval, elliptical, or other non-circular cross-section shape.

Finally, Appendix C illustrates the difference in configuration and appearance of a new tablet, and an expended tablet. The expended tablet configuration reflects the effects of fluid flow through the central fluid passageway of the tablet.

Figure 8:
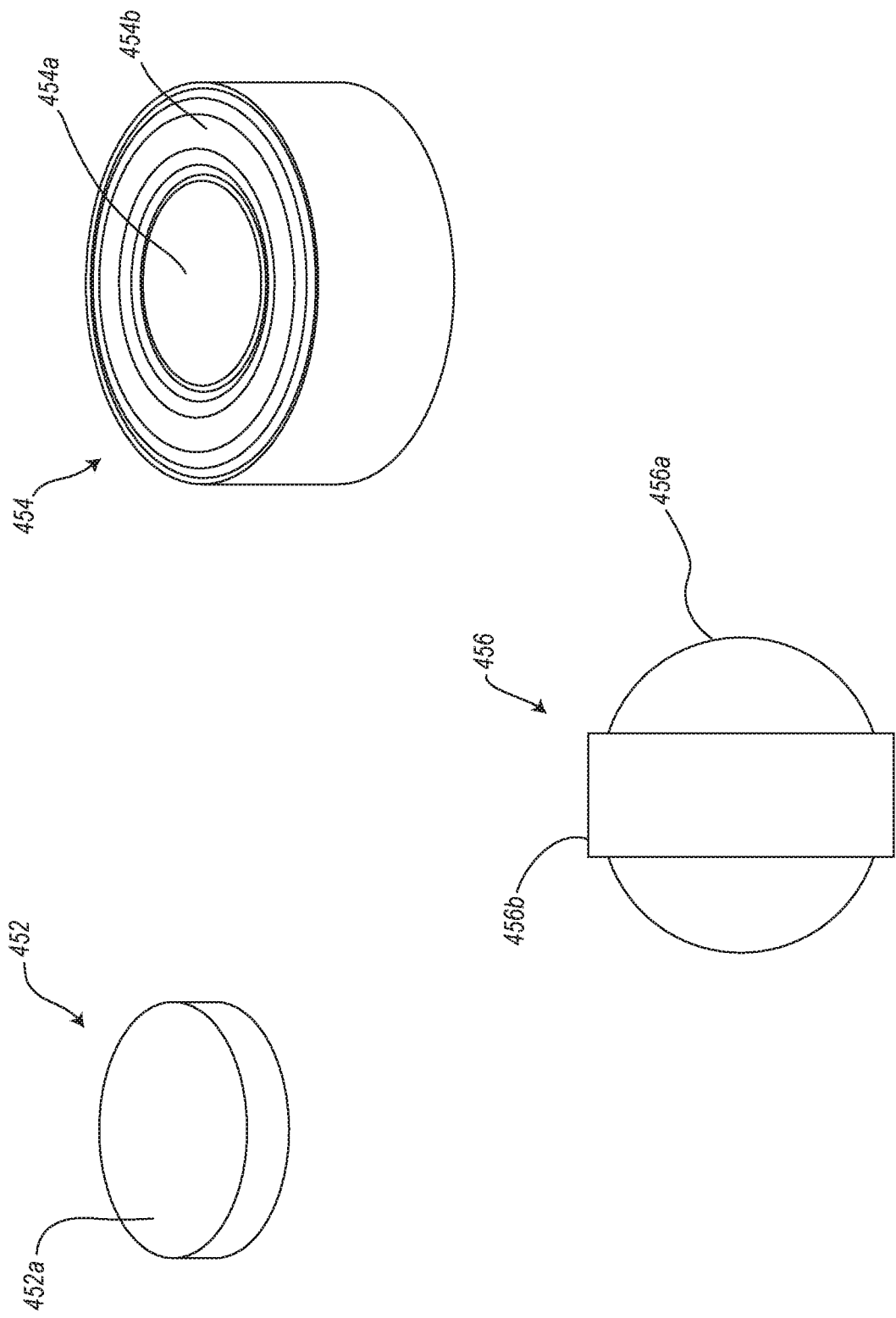
FIG. 8 discloses some example tablet geometries.

With reference now to FIG. 8, details are provided concerning some additional example tablet configurations. Yet other tablet configurations are disclosed in the Appendices noted herein. As will be apparent from the variety of different tablet configuration disclosed herein, the scope of the invention is not limited to any particular tablet configuration. By way of illustration, while some of the disclosed table configurations are generally round, other shapes and configurations, examples of which include, but are not limited to, ovals, cylinders, wedges, tubes, spheres, and cubes, may be employed in one or more alternative embodiments.

As indicated in FIG. 8, one example tablet configuration 452 is disk or lozenge shaped and has a generally flat upper surface 452a and/or lower surface (not shown). While shown as solid, other embodiments of the tablet 452 can include a fluid passageway, such as in the form of a central opening for example, which may have a cylindrical configuration, and/or other openings in other locations in the tablet 452.

The example tablet 454 has a generally donut shaped configuration that includes a central opening 454a. The inside diameter of the central opening 454a can be any size. Considerations that inform selection of the inside diameter size may include pressure drop of fluid passing through the central opening 454a, and a desired dissolution rate of the tablet 454 material. As well, consideration may also be given to the fact that the inside diameter of the central opening 454a will increase over time as the tablet 454 material dissolves. This change in inside diameter of the central opening 454a may also affect pressure drop of the fluid as it passes through the central opening 454a. Finally, the upper surface 454b and/or the lower surface (not shown) of the tablet 454 may have a curved shape, with the curve extending between the edge of the central opening 454a to the edge of the tablet 454, though in other embodiments, the upper surface 454b and/or the lower surface may be substantially flat.

As further disclosed in FIG. 8, another embodiment of a tablet 456 includes a variety of shapes and physical features. The example tablet 456 has a generally spherical shape 456a and also includes a band 456b disposed about its diameter and having an outer surface that extends beyond a surface of the spherical portion. This particular implementation of the tablet 456 does not include a central opening, or any other opening. However, alternative embodiments of the tablet 456 may include a central opening and/or other openings, examples of which are disclosed herein.

H. Aspects of Some Example Delivery Mechanisms

As noted elsewhere herein, additives can be employed in a variety of different ways. In some embodiments, the additives are separate from the filter media but are located within the cavity inside the filter and delivered to a fluid flow after filtration of that fluid flow. This approach, while advantageous, is counterintuitive in that it can be relatively difficult to implement, and since the filter is submersed in the fluid during a dispensing operation.

In at least some embodiments, such as some FAYP systems for example, an additive tablet can take the place, and form, of a filter core cover of a filter cartridge. One advantage of this approach is that existing stocks of the FAYP filter cartridge could be easily modified to include an additive tablet. As well, no tooling changes are required for new FAYP filter cartridges, since no new parts are required. Instead, the additive tablet would simply be installed where the filter core cover would have otherwise been installed.

With attention now to Appendix D hereto, which is incorporated herein in its entirety by this reference, details are provided concerning an example use environment for one or more embodiments of an additive tablet. As shown, an FAYP system is disclosed that includes a lid to which a cage of a filter cartridge is configured to be releasably connected. A filter core cover is also typically provided that is configured to reside partly, or completely, within the cage.

The filter core cover is configured to releasably connect to the cage. Filter media can be wrapped around the filter core so that fluid flowing radially into the filter core first passes through the filter media. Filtered fluid present in the filter core then exits the filter core, such as during a dispensing operation, and would ordinarily pass through the filter core cover. In embodiments where the filter core cover has been replaced with a tablet, the filtered fluid exiting the filter core then passes through the tablet prior to being dispensed from the container. Thus, in some embodiments at least, the configuration of the tablet can be similar, or even identical, to that of the filter core cover, although that is not necessarily required. As noted elsewhere herein, the tablet can alternatively take the form of a disk, or may have a donut configuration, for example.

It should be noted that while the example of Appendix D is directed to an FAYP system that includes a pitcher, the scope of the invention is not limited to that example configuration. Rather, the scope of the invention extends broadly to encompass any FAYP system configuration including, but not limited to, FAYP system configurations that utilize alternative types of containers such as bottles, jugs, carafes, or any other container capable of holding fluid.

Figure 9A:
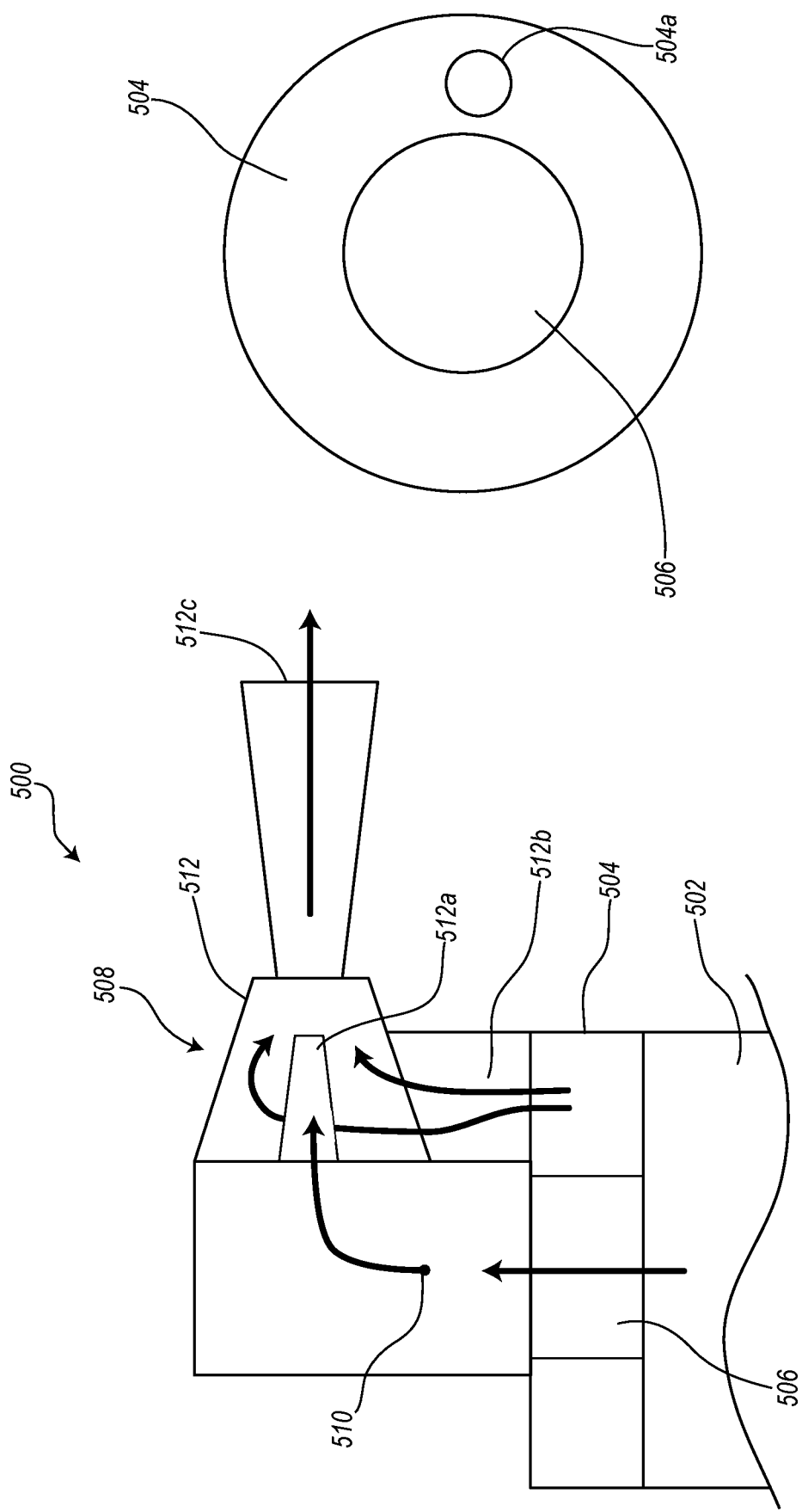
FIGS. 9A and 9B are directed to an example additive delivery system and associated schematic.
Figure 9B:
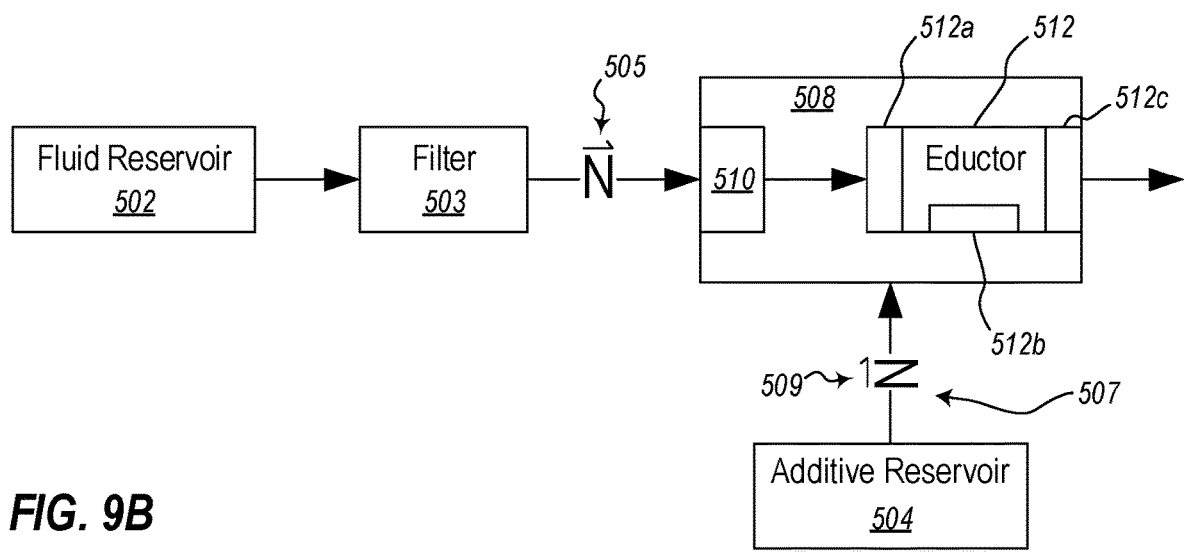

With attention now to FIGS. 9a and 9b, details are provided concerning a delivery mechanism that employs aspiration to introduce a liquid form additive into a fluid stream, such as a stream of filtered water. Any or all components of the delivery mechanism disclosed in FIGS. 9a and 9b can be made of plastic, although other materials could be used.

One specific embodiment of such a delivery mechanism is denoted generally at 500. As shown, the example delivery mechanism 500 may take the form of a bottle that includes a fluid reservoir 502 configured to hold a volume of fluid such as water, or filtered water. In cases where the delivery mechanism 500 takes the form of a bottle or other container from which a stream of fluid can be poured, the delivery mechanism 500 may be referred to as a stream system.

While not specifically shown in FIGS. 9a and 9b, the bottle may implement a filter as you pour (FAYP) configuration that includes one or more filter elements configured and arranged so that unfiltered water in the fluid reservoir 502 passes through the filter element(s) before being dispensed from the bottle.

An additive reservoir 504 is provided that is isolated from the fluid reservoir 502 so that fluid in the fluid reservoir 502 cannot enter the additive reservoir. In the illustrated example, this isolation is achieved by an additive reservoir 504 that has a ring-shaped cylindrical form in which the additive reservoir 504 has a donut-shaped cross section. Thus configured, the additive reservoir 504 enables fluid to pass through the center 506 of the ring-shaped additive reservoir 504 without any risk of the fluid entering the additive reservoir 504. Any other configuration of an additive reservoir that provides this functionality may alternatively be used. The additive reservoir 504 can be placed upstream, or downstream, of the fluid reservoir 502 although, as discussed below, the additive from the additive reservoir 504 is not introduced into the fluid flow until after the fluid has been filtered.

The opening 506 in the additive reservoir 504 is in fluid communication with not only the fluid reservoir 502, but also a dispensing head 508. The dispensing head 508 includes a fluid inlet 510 and an eductor 512 downstream of, and in fluid communication with, the fluid inlet 510. Particularly, the eductor 512 includes an inlet 512a that communicates with an educting connection 512b, and the inlet 512a also communicates with an outlet 512c. The educting connection 512b is in fluid communication with an outlet 504a of the additive reservoir 504, and a fluid conduit or other fluid passageway (not shown) that connects the educting connection 512b with the outlet 504a may include a check valve or other reverse flow preventer to ensure that fluid in the eductor 512 does not backflow into the additive reservoir 504.

The fluid connections noted in the foregoing discussion, and other components, are shown in schematic form in FIG. 9b in particular. In particular, and with continued reference to FIGS. 9a and 9b, a filter 503 is positioned between the fluid reservoir 502 and the dispensing head 508, and a backflow preventer 505 is provided inline between the filter 503 and the dispensing head 508 to prevent fluid in the dispensing head 508 from entering the filter 503. As well, a fluid conduit 507 connects the additive reservoir 504 with the educting connection 512b and a backflow preventer 509 is provided between the additive reservoir 504 and the eductor 512 to prevent fluid in the eductor 512 from entering the additive reservoir 504.

With continued reference to FIGS. 9a and 9b, components of the delivery mechanism 500 in the form of a bottle can take various sizes, although it should be noted that the disclosed dimensions are provided only by way of example, and are not intended to limit the scope of the invention in any way. With reference first to the dispensing head 508, a combined overall height of the dispensing head 508 and additive reservoir 504 can be in the range of about 47 mm to about 49 mm and, in some particular embodiments, the combined overall height of the dispensing head 508 and additive reservoir 504 can be about 48 mm. An overall length of the dispensing head 508 can be in the range of about 49 mm to about 51 mm and, in some particular embodiments, the overall length of the dispensing head 508 can be about 50 mm.

With regard specifically to the additive reservoir 504, an overall height of the additive reservoir 504 can be in the range of about 13 mm to about 15 mm, and in one particular embodiment, is about 14 mm. As well, an outside diameter of the additive reservoir 504 can be in the range of about 30 mm to about 32 mm, and in one particular embodiment, the outside diameter of the additive reservoir 504 is about 31.35 mm. The opening 506 defined within the additive reservoir 504 can have a diameter in the range of about 11 mm to about 313 mm, and in one particular embodiment, the diameter of the opening 506 is about 12 mm. In one example embodiment, the additive reservoir 504 has a volume of about 3 mL to about 4 mL, although larger or smaller volumes could be implemented.

Turning finally to the outlet 512c of the eductor 512, the outlet 512c can have a generally tubular, or funnel-shaped form, whose overall length can be in the range of about 19 mm to about 21 mm, with one particular embodiment having an overall length of about 20 mm. An outside diameter of the outlet 512c can be in the range of about 4 mm to about 6 mm, with one particular embodiment having an outside diameter of about 5 mm.

With regard to some example fluids and related parameters, the example delivery mechanism 500 can be employed with water and is capable of dispensing filtered water combined with one or more introduced additives at flow rates in a range of about 2.5 L/min to about 4.5 L/min, at pressures in a range of about 4 cm $H_2O$ to about 16 cm $H_2O$. The water density, without additives, is assumed to be in a range of about 0.997 to about 1.000 g/L, and the temperature of the water and additives at delivery is assumed to be in the range of about 4 C to about 25 C.

Some example liquid additives have a flow rate in a range of about 0.05 mL/min to about 0.09 mL/min. These example liquid additives have a density anywhere in a range of about 2500 g/L to about 50,000 g/L. The concentration of the liquid additive(s) is a function of their maximum solubility in water, and their chemical stability.

Figure 10A:
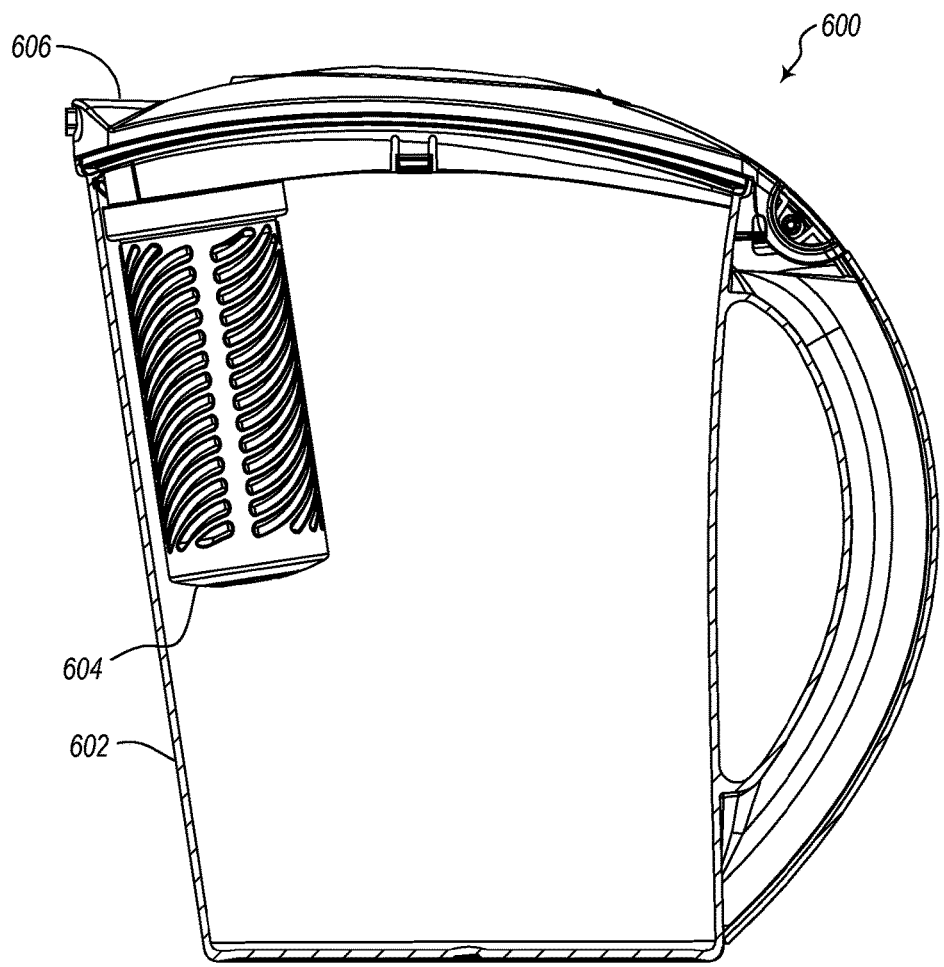

Turning now to FIGS. 10a-10g, details are provided concerning another example delivery mechanism, one specific embodiment of which is an FAYP pitcher denoted generally at 600, and which may be similar to the device showed in Appendix D. As shown in FIG. 10a, the pitcher 600 includes a fluid reservoir 602 (shown transparent in FIG. 10a) in which a filter cartridge 604 is partly, or completely, disposed. The filter cartridge 604 is releasably connected to a lid 606, and the lid 606 is removable from the fluid reservoir 602.

Figure 10B:
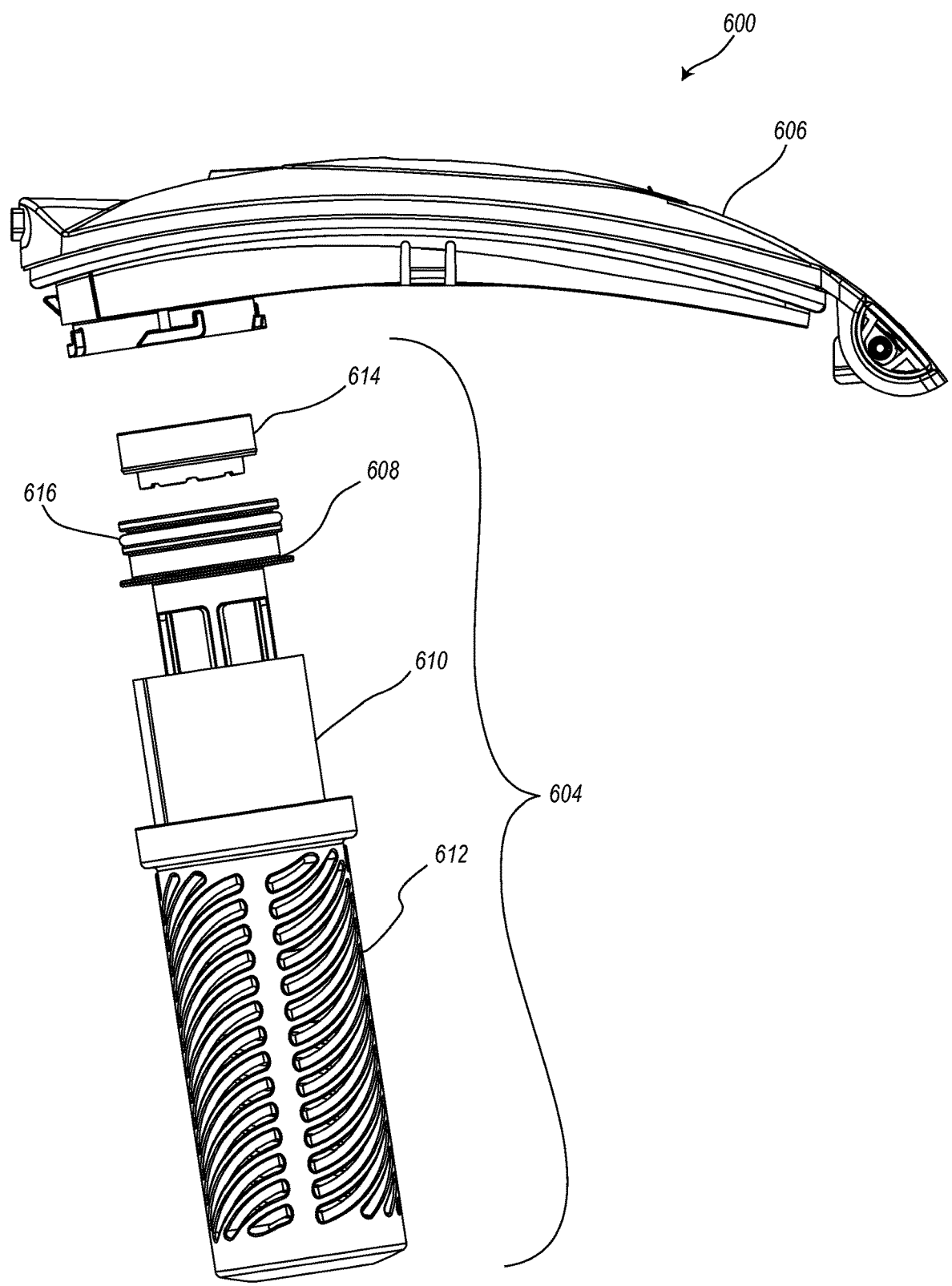
Figure 10C:
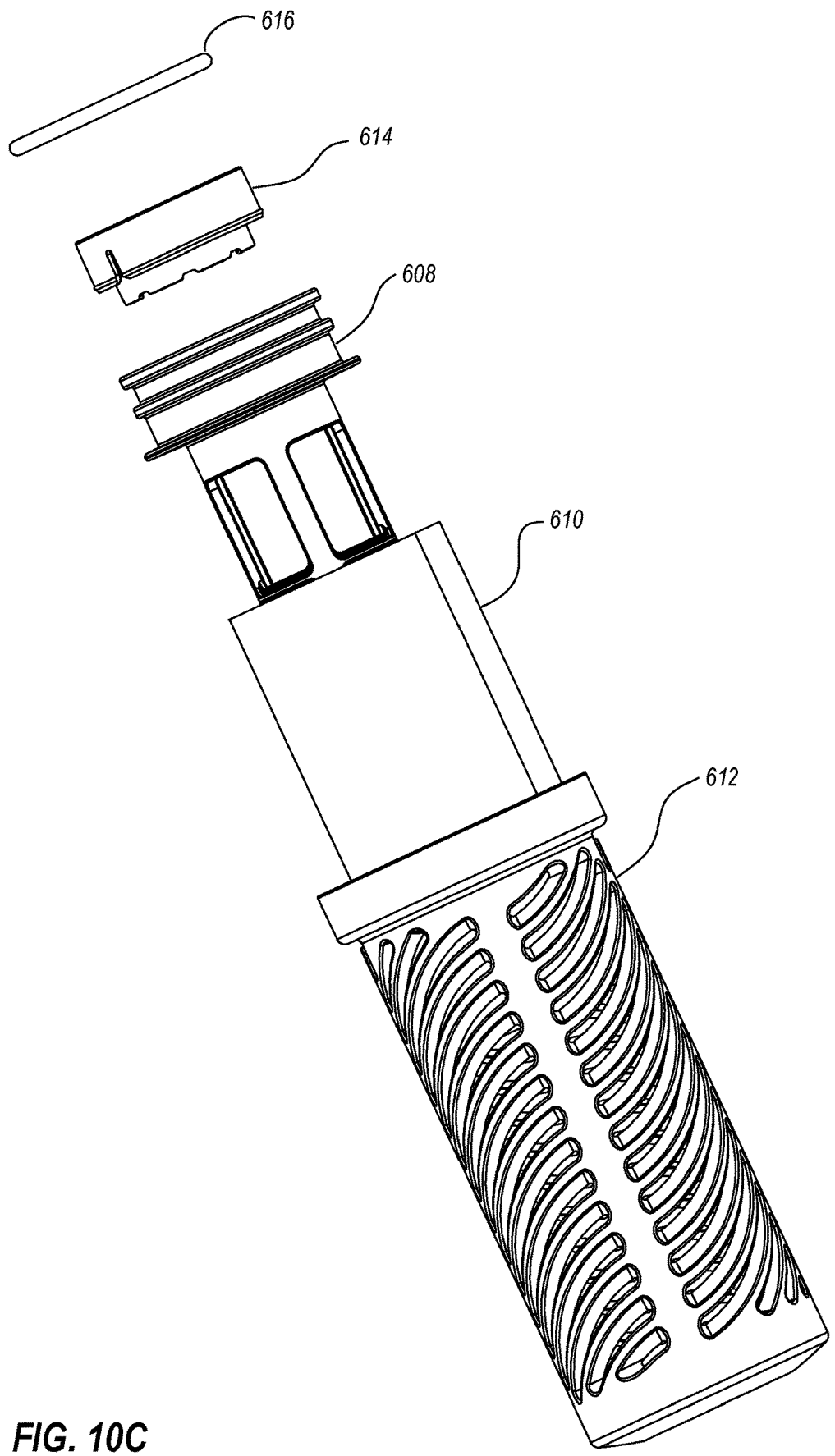

With attention now to FIG. 10b and FIG. 10c, the filter cartridge 604 includes a filter core 608, and a filter media 610 is wrapped around the filter core 608. The filter media 610 may take various forms, including the form of an activated carbon textile material, examples of which are disclosed herein and which include activated carbon felt (ACF) material. The filter media 610 is configured and arranged about the filter core 608 so that the filter media 610 presents a curved surface to a stream of water or other fluid passing into and/or out of the filter core 608.

The filter core 608 and filter media 610 are configured to be removably received in a cage 612. The cage 612 is perforated to enable fluid flow into, and out of, the filter cartridge 604. As well, the cage 612 is configured to be releasably connected to the lid 606. This releasable attachment of the cage 612 to the lid 606 can be implemented in various ways, including a quarter-turn bayonet configuration or a half-turn bayonet configuration. Any other suitable mechanisms could alternatively be used however.

As further indicated in FIGS. 10b and 10c, the example filter cartridge 604 also includes a filter core cover 614. In general, the filter core cover 614 serves to releasably retain the filter core 608 and filter media 610 in the cage 612. As such, the filter core cover 614 can be releasably locked to the cage 612, and unlocked with, for example, a quarter-turn bayonet configuration or a half-turn bayonet configuration.

As discussed in more detail below, a tablet may serve as the filter core cover 614. That is, rather than being made of plastic or another material, part or all of the filter core cover 614 may comprise, or consist of, any one or more of the tablet components disclosed herein, such as binders and additives, for example. In this implementation, the filter core cover 614, or a portion thereof, is a consumable item. As such, the filter core cover 614 may be configured to have a life that is about the same as an expected life of the filter media 610, such that the filter media 610 and filter core cover 614 can be replaced at about the same time.

In still other embodiments, the filter core cover 614 may comprise, or consist of, an additive reservoir that may have a configuration similar, or identical, to the additive reservoir 504 disclosed in FIG. 9a. By way of illustration, the filter core cover 614 in this example may define a fluid reservoir configured to hold one or more additives in liquid form. With the filter core cover 614 thus configured and arranged, additives from the fluid reservoir can be dispensed into a stream of filtered fluid exiting the filter cartridge 604.

Figure 10D:
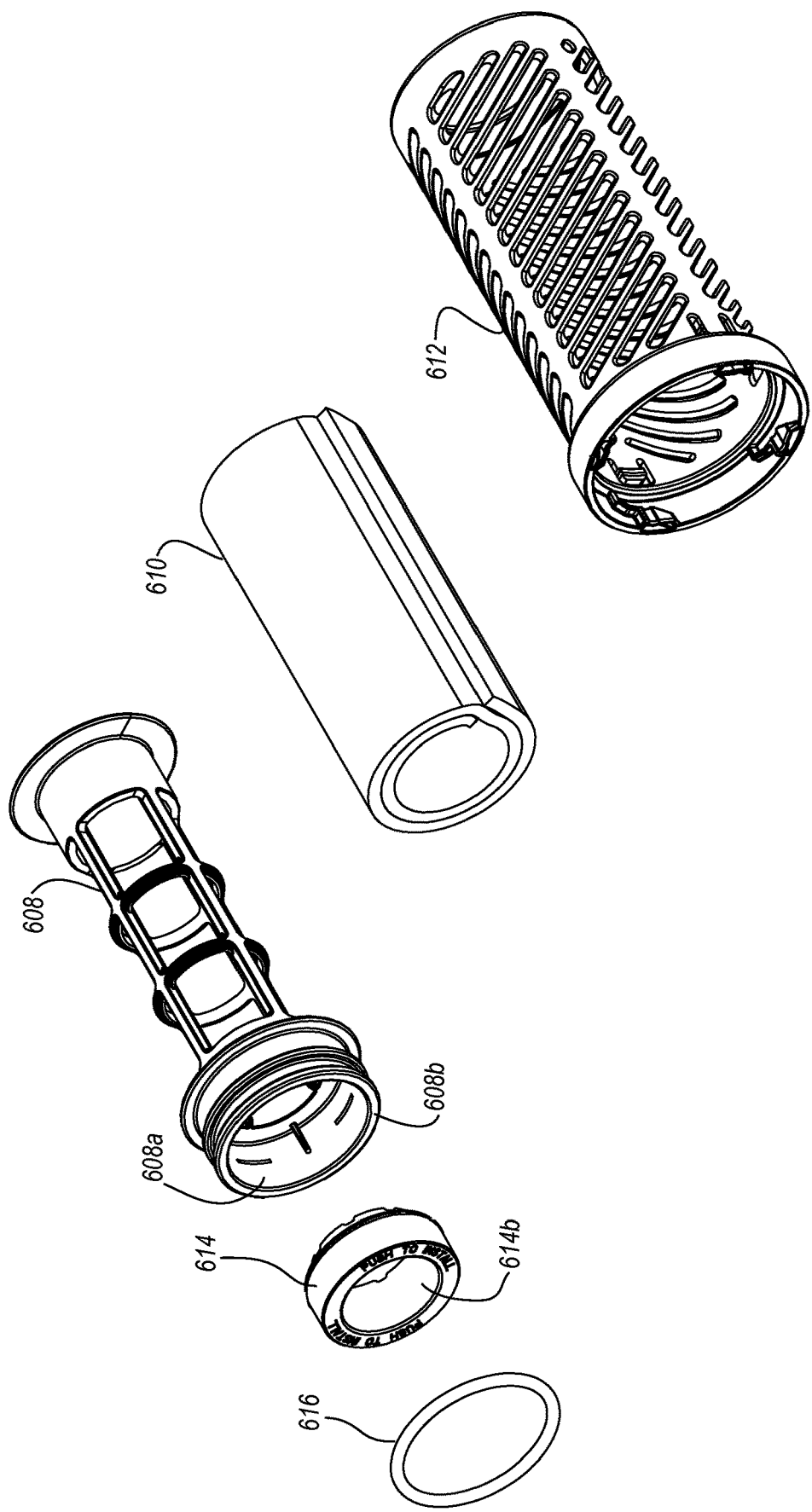

With continued reference to FIG. 10c and FIG. 10d, the filter cartridge 604 can be sealed to the lid 606 by way of one or more sealing elements 616, such as an O-ring for example. Thus arranged, the sealing element 616 prevents fluid in the fluid reservoir from bypassing the filter cartridge 604 and, particularly, the filter media 610, and exiting the pitcher 600. That is, when the sealing element 616 is in position, fluid in the fluid reservoir 602 can only exit the pitcher 600 during a pouring operation after first passing through the filter media 610.

Turning next to FIGS. 10f and 10g, further details are provided concerning an example configuration of the filter core cover 614. As shown, the filter core cover 614 is configured to reside in a recess 608a defined by the filter core 608. The filter core cover 614, thus positioned, has an upper surface 614a that may be flush, or nearly so, with an upper edge 608b of the filter core 608. The filter core cover 614 defines a fluid passageway, in the form of an opening 614b, that is in fluid communication with an interior 608c of the filter core 608. With the filter core cover 614 thus configured and arranged, fluid passing through the filter media 610 and into the interior 608c of the filter core 608 can then exit the filter cartridge 604 by way of the filter core cover 614 and, in doing so, the additive(s) and or other materials that make up the filter core cover 614 are dissolved and mix with the exiting fluid stream. Moreover, fluid in the fluid reservoir 602 cannot contact the filter core cover 614 without having first passed through the filter media 610.

In some embodiments, such as when the filter core cover 614 comprises, or consists of, one or more tablet components, the filter core cover 614 may be configured and arranged so that it is only in contact with fluid during a fluid dispensing operation. At other times, such as when the pitcher 600 is not being used and is sitting on a table or counter for example, the filter core cover 614 may be positioned above an upper surface of the fluid in the fluid reservoir 602. In this way, the additives, binders and/or other materials that make up part, or all, of the filter core cover 614, do not prematurely dissolve, and are not mixed with unfiltered water. It should also be noted that while the filter core cover 614 is indicated as defining a fluid passageway, other embodiments of FAYP systems, including pitcher systems as exemplified in FIGS. 10a-10g, may use a tablet, or tablets, that do not define a fluid passageway. One example of such a tablet is disclosed in FIG. 8, discussed above.

Figure 11B:
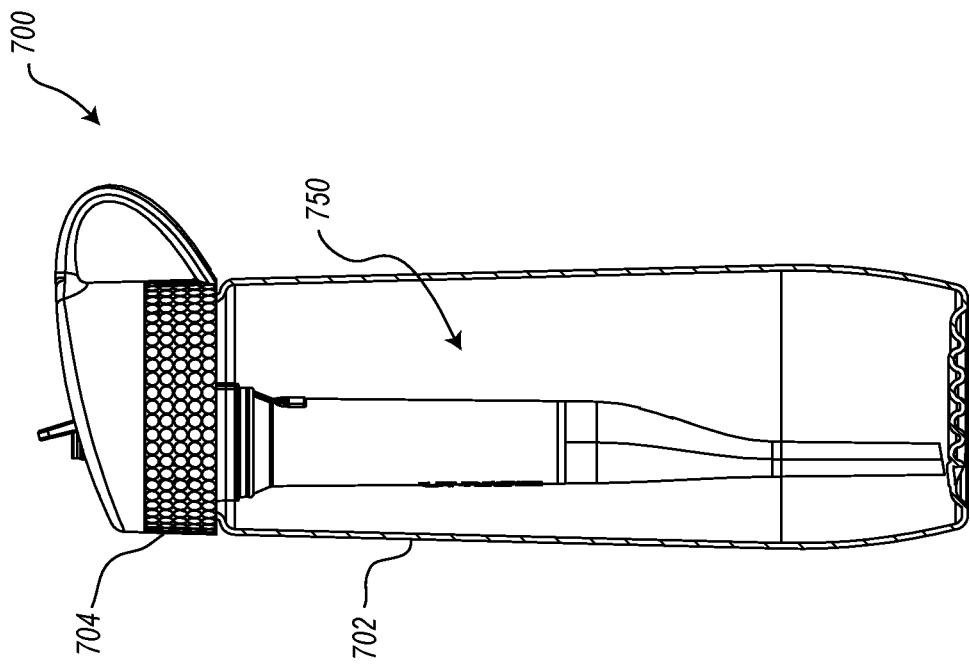
FIGS. 11A-11C disclose aspects of an example FAYP bottle system that employs a tablet additive delivery mechanism.
Figure 11A:
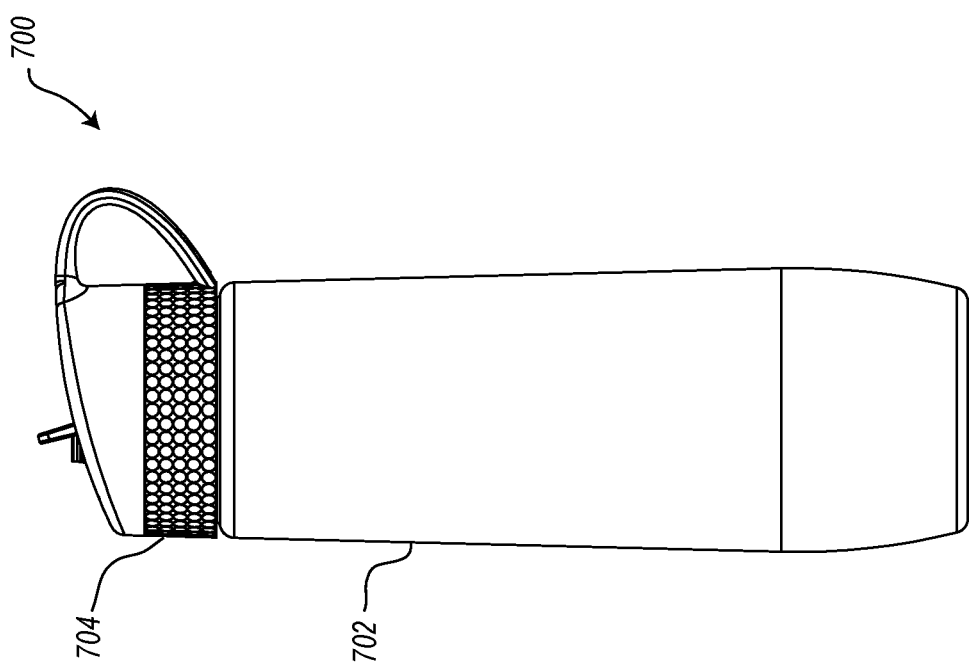
Figure 11C:
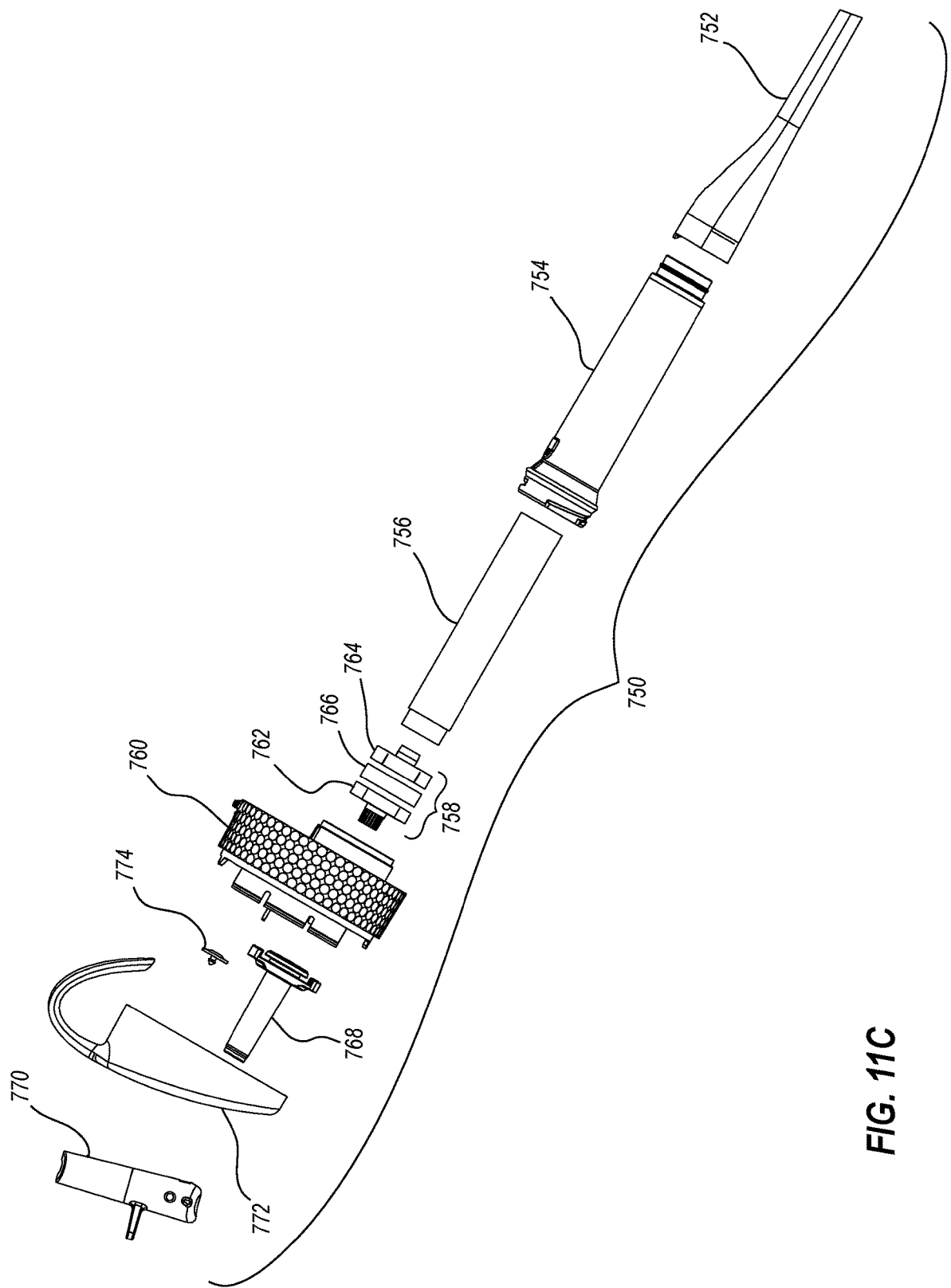

Turning now to FIGS. 11a-11c, details are provided concerning another example delivery mechanism, one specific embodiment of which is an FAYP bottle denoted generally at 700. As discussed in more detail below, the bottle 700 may be referred to as comprising a straw system, inasmuch as fluid is withdrawn from the bottle 700 by way of a straw. The bottle 700 includes a fluid reservoir 702 and a detachable cap 704. Also provided is a straw assembly 750 configured to detachable connect to the cap 704 and extend downward into the fluid reservoir 702 so that the lower end of the straw assembly 750 is located proximate the bottom of the fluid reservoir 702.

The example straw assembly 750 includes a lower straw portion 752 that is releasably connected, such as by threads, to a filter housing 754. A filter element 756 is configured to be removably received within the filter housing 754. The filter element 756 can comprise, or consist of, any of the filter media materials disclosed herein.

As well, a filter cap assembly 758 is provided that serves to confine the filter element 756 in the filter housing 754, while also serving as an interface between the filter housing 754 and the lower cap portion 760. The filter cap assembly 758 may be releasably connected to the filter housing 754 by way of threads, or by way of any other suitable mechanism.

In one example embodiment, the filter cap assembly 758 includes a top cap 762 and bottom cap 764 that cooperate to define a cavity within which one or more tablets 766 may be disposed. The tablet 766 need not have any particular configuration or size, but in at least some embodiments, the tablet 766 has a donut shaped configuration. The tablet, or tablets, 766 can include any combination of the example tablet components and ingredients disclosed herein. The cavity may be fluid-tight, such as by way of sealing elements (not shown) in the top cap 762 and/or the bottom cap 764, so that fluid in the fluid reservoir 702 cannot come into contact with the tablet 766 except by way of the lower straw portion 752. One or both of the sealing element(s) can take the form of O-rings, although any other suitable configuration for one or both of the sealing element(s) could be used. In some embodiments, the top cap 762 and the bottom cap 764 may each include complementary threaded portions so that they can be releasably connected to each other. Other mechanisms could be used for releasably connecting the top cap 762 and the bottom cap 764 however.

With continued reference to FIGS. 11*a*-11*c*, the example straw assembly 750 further includes a spout seal 768 that resides in the lower cap portion 760 and provides a fluid connection between the top cap 762 of the filter cap assembly 758 and a spout 770 that is connected to an upper cap portion 772. Finally, a check valve 774, or other suitable backflow preventer, is provided inline to prevent fluid in the spout 770 from flowing back into the straw assembly 750.

Operationally, a user can withdraw fluid, such as water, from the fluid reservoir 702 by way of the straw assembly 750, by sucking on the spout 770. As the fluid passes from the fluid reservoir 702 and through the straw assembly 750, the flowing fluid first passes through the filter element 756, and then the filtered fluid comes into physical contact with the tablet 766. That is, the tablet 766 is located downstream of the filter element 756, relative to a direction of flow beginning from the fluid reservoir 702 toward the spout 770. The contact between the filtered fluid and tablet 766 causes some of the tablet material to dissolve and enter the fluid stream. As a result, the fluid that exits the spout 770 has been filtered by the filter element 756, and also includes one or more additives as a result of the partial dissolution of the tablet 766. In connection with the foregoing, it is noted that in general, the straw assembly 750 may be substantially fluid tight such that fluid can only enter the straw assembly 750 by way of the lower straw portion 752, and exit the straw assembly 750 by way of the spout seal 768.

Figure 12A:
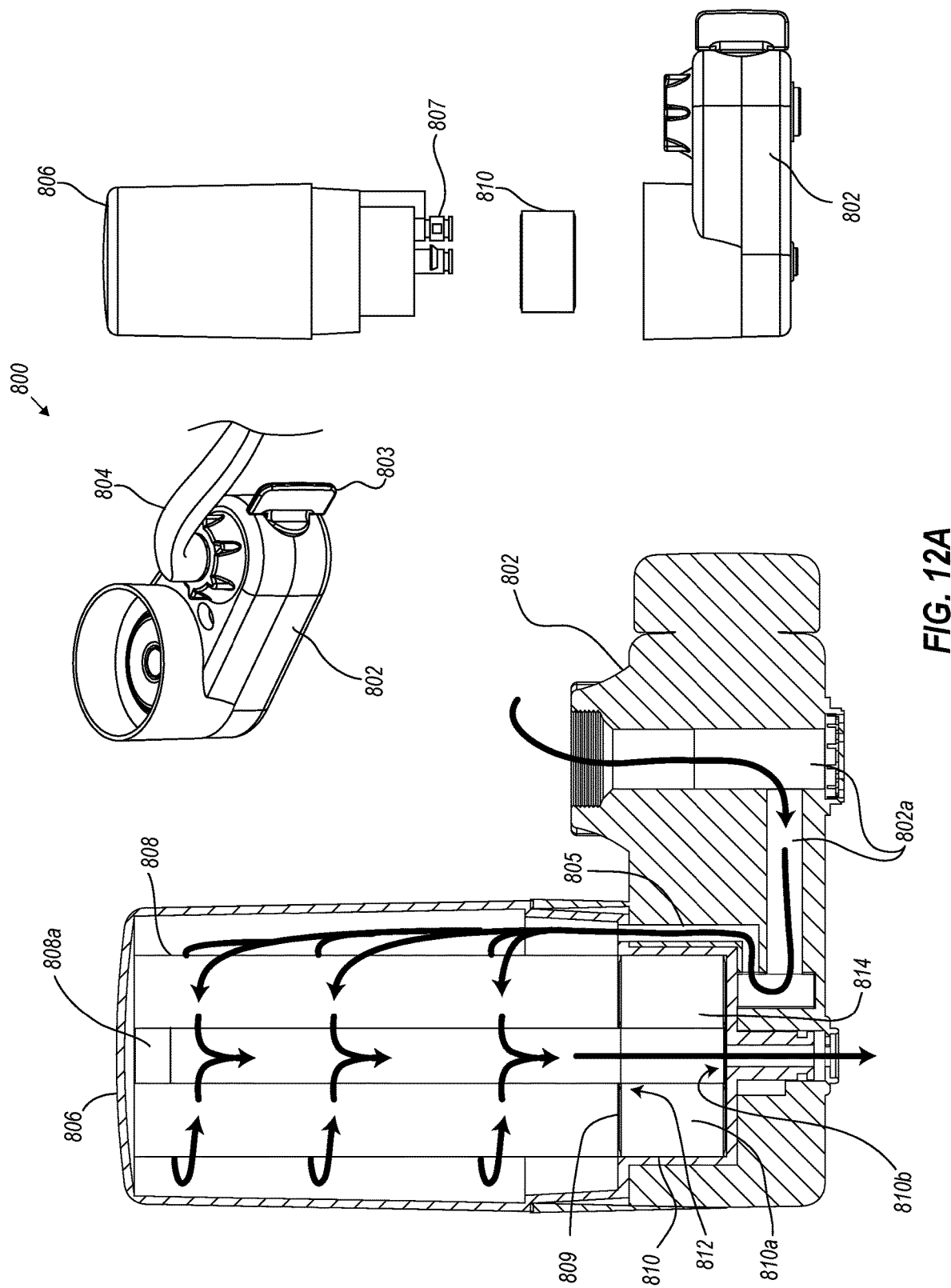
FIG. 12A discloses aspects of an example faucet mount embodiment.

With reference now to FIG. 12*a*, details are provided concerning another example delivery mechanism, one specific embodiment of which is a faucet mount configuration denoted generally at 800. The faucet mount configuration 800 includes a first housing 802 that is removably connectable to a faucet 804, such as might be found in a residence. A valve 803, such as a quarter turn ball valve for example, may be provided that controls flow from the faucet 804 to the housing 802. For example, it may be desirable to secure the flow of water from the faucet 804 to the housing 802 when there is a need to replenish additives in the housing 802, discussed below.

The first housing 802 defines an internal chamber 802*a* that is in fluid communication with the faucet 804 such that water flowing out of the faucet 804 enters the internal chamber 802*a* of the housing 802. The housing 802 is also in fluid communication with an inlet 805 of a filter chamber 806 in which a filter element 808 and/or filter media are disposed. The filter element 808 can be any of the filter elements or filter media disclosed herein. The inlet 805 or other portion of the filter chamber 806 may include a check valve 807 or other backflow preventer configured and arranged so that water entering the filter chamber 806 by way of the inlet 805 cannot exit the filter chamber 806 through the inlet 805.

In the illustrated configuration, the filter element 808 and filter chamber 806 are configured so that fluid entering the inlet 805 passes through the filter element 808 and into a passageway 808*a* defined by the filter element 808. One or more sealing elements 809, such as an O-ring for example, may be provided that close a space between the bottom of the filter element 808 and the filter chamber 806. In this way, water entering the filter chamber 806 cannot pass out of the filter chamber 806 without first passing through the filter element 808. That is, the sealing element 809 prevents fluid bypass of the filter element 808.

With continued reference to FIG. 12*a*, a housing 810 is provided that is located proximate an outlet 812 of the filter chamber 806, and may be located either inside or outside the filter chamber 806. The outlet 812 is in fluid communication with the passageway 808*a* of the filter element 808 and in fluid communication with a chamber 810*a* defined by the housing 810. The chamber 810*a* may include one or more tablets 814, examples of which are disclosed herein, and/or the chamber 810*a* may hold one or more liquid additives.

The chamber 810*a* and outlet 812 are configured and arranged so that filtered water exiting the filter chamber 806 by way of the outlet 812 passes into contact with the tablet(s) 814, and/or fluid additives, before exiting the housing 810 by way of the outlet 810*b*, and into a glass or cup, for example. As the filtered water flows into contact with the tablet 814, some of the tablet 814 material dissolves and enters the fluid stream and, as a result, the fluid ultimately dispensed from the faucet mount configuration 800 into the glass or cup is water that has been filtered and that also includes one or more additives.

In the illustrated example, the faucet mount configuration 800 is configured and arranged such that fluid pressure from the faucet, and the hydrostatic pressure imposed by gravity, act together to move water through the filter element 808 and into the housing 810 that holds the tablet 814. It should be noted that while the housing 810 is shown separately in the exploded view on the right hand side of FIG. 12*a*, the housing 810, in at least some embodiments, is integrated together with the filter chamber 806 and filter element 808 to form a single unit, as shown in the section view on the left hand side of FIG. 12*a*, that can be removed and replaced by a user when the filter element 808 and/or additive(s) have reached the end of their useful life.

Figure 12B:
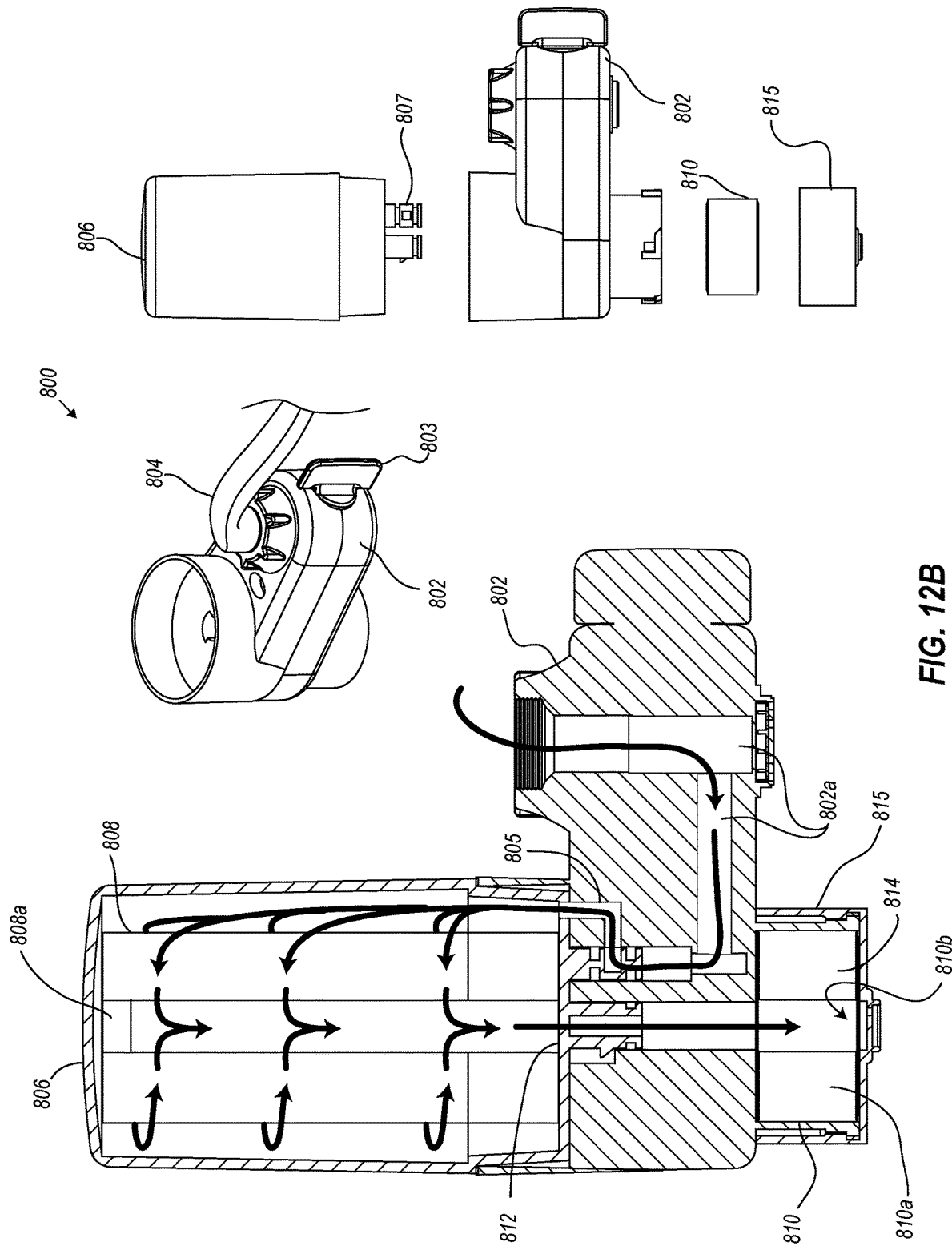
FIG. 12B discloses aspects of another example embodiment of a faucet mount configuration.

With reference briefly now to FIG. 12*b*, an alternative faucet mount configuration is shown. As the embodiment of FIG. 12*b* may be, but is not necessarily, similar in many regards to the embodiment of FIG. 12*a*, the numbering from FIG. 12*a* has largely been retained in FIG. 12*b*. Note that while a sealing element 809 is not specifically illustrated in FIG. 12*b*, such a sealing element may be present in that embodiment and serves the same function as the sealing element 809 of FIG. 12*a*.

In general, and by way of contrast, the housing 810 that holds one or more additives is located inside the first housing 802 in FIG. 12*a*, but the housing 810 is located outside, specifically, below, the first housing 802 in FIG. 12*b*. Correspondingly, a housing cover 815, which may be removably attached to the first housing 802 with threads for example, is provided in the embodiment of FIG. 12*b* that confines a tablet 814 and/or other additive within the housing 810. In this configuration, it may be relatively easy for a user to replenish additives in the housing 810 when needed by simply removing the housing cover 815 to gain access to the interior of the housing 810.

I. Some Alternative Embodiments

Although some embodiments are directed particularly to FAYP system configurations, it will be appreciated that yet other configurations within the scope of the invention can be employed as well. For example, additive tablets could be employed in environments such as faucets, one example of which was discussed earlier herein, and refrigerator filters. Thus, embodiments of the invention include disposable refrigerator filters with an integrated additive tablet, and faucets configured to removably receive one or more additive tablets. Some faucets may include a separate disposable filter that contains one or more additive tablets.

In yet other embodiments, delivery systems are provided that are located outside the pitcher, faucet and bottles but attached to the fluid container, such as by way of via hook-and-loop attachment systems, or command adhesives. Such arrangements and configurations can enable customization of flavors and nutrients as well as portability. A non-exclusive list of some example embodiments is set forth below.

One example embodiment takes the form of a caddy with Mio type bottles of flavor/nutrient-powder, liquids, and soluble films. This embodiment may be relatively easy to use as multiple units can be held in one place. Another example embodiment is directed to the use of soluble film packages, like breath strips that can be dropped on a glass, or bottle, individually.

Still other embodiments concern sensory stimuli that can be generated when a material, or materials, come into contact with a fluid, such as filtered water for example. In particular, some of such embodiments are directed to aroma stickers that will release aroma only with water contact, aromatic oil stickers that can be stuck to a glass and emit aromas as the user drinks, aromatic lid stickers stuck to the underside of pitcher lids, membranes disposed in or near a fluid container so as to release some flavors and/or nutrients as fluid contacts the membrane, and non-dissolving aromatic oil drops that float on a fluid surface inside a fluid container such as a pitcher.

Another example embodiment of the invention is directed to a straw that includes an integrated filter. The straw and/or filter includes additives such as flavoring that are added to fluid as it flows through the straw. The additives may be located downstream of the filter.

Yet other example embodiments are directed to containers, examples of which include pitchers and bottles that include an infusion compartment. In these embodiments, one or more additives can be placed in the infusion compartment and can release their content to the fluid in the container. In addition to the additives disclosed elsewhere herein, other additives that can be used in an infusion compartment configuration include tea bags, and freeze dried fruits, which may be at least partly reconstituted by contact with the fluid.

In other embodiments, variations on an FAYP system are contemplated. For example, in some embodiments, an additive is included in or on a sticker, tablet, or other device, that is placed underneath spout cover so that as fluid is dispensed from the container by way of the spout, the fluid contacts the sticker or tablet. In another example, a removable film-type additive dispenser can be located at the tip of a pitcher spout so that as fluid is dispensed from the container by way of the spout, the fluid contacts the film. As a final example, an additive dispenser can take the form of a spout hanger positioned on the inside of a container and arranged for contact with fluid as fluid is dispensed from the container, and the additive can take various forms, such as sachet, tablet, or beads, to name a few examples.

In some instances, additive delivery systems can be further enhanced and enabled in various ways. For example, some additive delivery system enablers and enhancements include encapsulation, controlled release of $CaCO_3$, other minerals, anti-bitter agent as enabler (masking taste) like Talim, enhancers like glutamic acid, $CO_2$ such as for water carbonation, fizzy tablet, soluble film or powder (such as citric acid+bicarbonate), or $CO_2$ contained in compressed cylinders mounted to the system, and pH control (acid or basic depending on taste).

Various other features of exemplary systems may be disclosed in one or more of the following patent applications, each herein incorporated by reference: U.S. patent application Ser. Nos. 15/038,982; 14/569,397; 15/038,996; 15/038,998; 15/039,002; and 15/039,008.

J. Aspects of Some Example Embodiments

As will be apparent from this disclosure, at least some embodiments of the invention may have one or more useful aspects, although this is not necessarily required. Following is a list of some example aspects, one or more of which may be present in any combination in any one or more embodiments of the invention.

For example, at least some embodiments of the invention are configured such that no additional operations, beyond simply dispensing fluid from the fluid dispensing system such as through the use of a spout or straw, are required to be performed by the user in order to obtain a volume of filtered water that includes one or more additives. As another example, at least some embodiments do not require the user to perform any operations, beyond simply dispensing fluid from the fluid dispensing system such as through the use of a spout or straw, in order to introduce one or more additives into a stream of filtered water. Consistently, these and/or other embodiments of the invention are configured to automatically introduce one or more additives into a stream or volume of filtered water.

As well, at least some embodiments of the invention employ no more than one fluid container, particularly, a fluid container that stores a volume of unfiltered water, though some portions of these embodiments may store a de minimis amount of filtered water which remains in the fluid dispensing system upon completion of a dispensing process. Such portions that store a de minimis amount of filtered water are not considered to constitute fluid reservoirs or containers for the purposes of this disclosure.

Another aspect of some example embodiments of the invention is that the dose rate or concentration does not have to be affirmatively defined or specified by a user. Rather, the dose rate or concentration can be a function of the contents of the tablet, the size of the tablet, and a dissolution rate or rates that are characteristic of the tablet contents. Thus, a desired dose rate can be achieved without any additional action by the user beyond simply dispensing fluid from the fluid dispensing system, such as through the use of a spout or straw for example.

As well, and further to the foregoing, the dispensed concentration of a filtered fluid that includes one or more additives may be not adjustable by a user. Rather, the concentration of the additives in the stream of filtered fluid may be fixed, although adjustments can be made to the concentration of additives over time based on variables such as are noted in the immediately preceding example. Such adjustments are not made by a user however.

A further aspect of at least some embodiments of the invention is that, assuming adequate unfiltered water and additive supplies are present, such embodiments are always ready to dispense filtered water that includes one or more additives. That is, no user action beyond initially charging the fluid dispensing device with unfiltered water and placing one or more tablets in the fluid dispensing device, is required to configure or prepare the fluid dispensing device to dispense a volume or stream of filtered water that includes one or more additives.

Finally, at least some embodiments of the invention are fully manually operable and, as such, do not employ circuitry, computers or computer components, electric pumps, or any other non-manually operable components.

K. Some Example Trials and Results

Figure 13A:
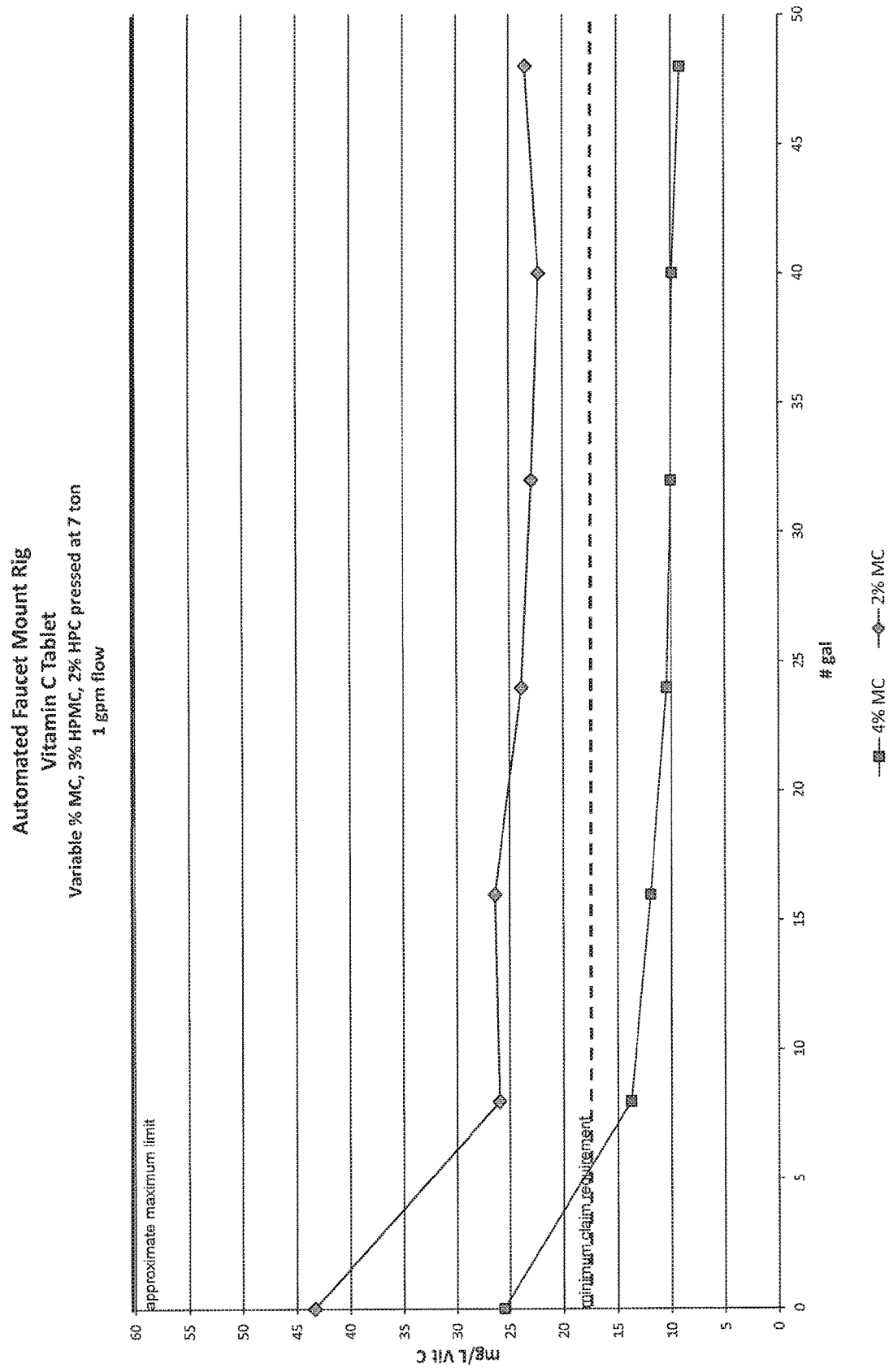
FIGS. 13A-13C are graphs indicating effluent concentration levels of various additives that were achieved in trials employing different exemplary solid tablet formulations.
Figure 13B:
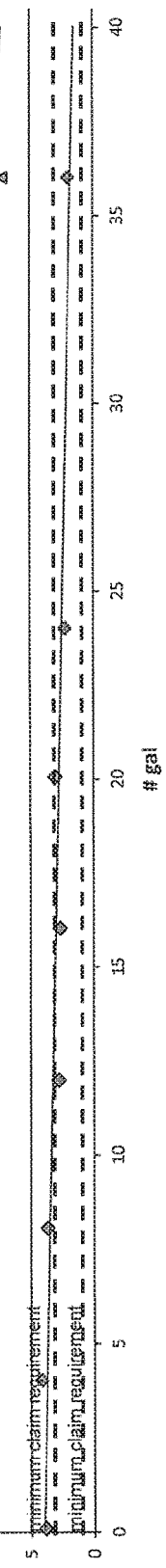
Figure 13C:
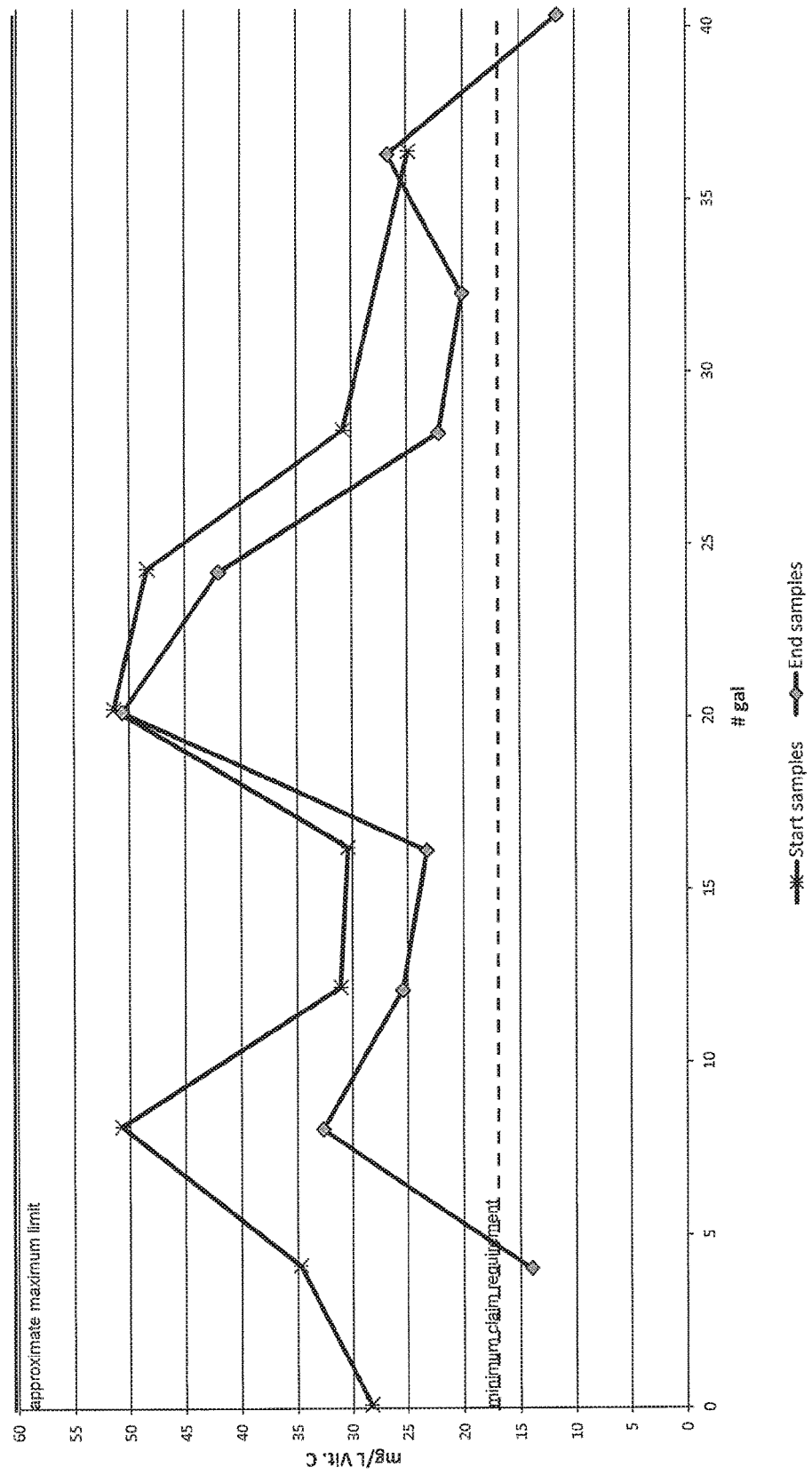

With attention now to FIGS. 13a, 13b and 13c, information is provided concerning some example trials and results that were achieved with various different additives and additive delivery mechanisms. Such trials and results are provided simply for the purpose of illustration and are not intended to limit the scope of the invention in any way.

With reference first to FIG. 13a, trial data from a faucet mount delivery mechanism, examples of which are disclosed in FIGS. 12a and 1b, is presented. As shown, the active additive is Vitamin C in tablet form. Example tablets included various percentages of methyl cellulose (MC)—ranging from about 2% MC to about 4% MC, along with about 3% hydroxypropyl methylcellulose (HPMC), and about 2% hydroxypropyl cellulose (HPC), and the remaining percentage of the composition was Vitamin C. The tablets were formed by pressing a mixture of the aforementioned ingredients with about 7 tons of pressure. The trial flow rate was maintained automatically at about 1.0 gallon per minute (GPM) by a faucet connected to the faucet mount delivery mechanism.

As shown in the graph in FIG. 13a, which shows additive concentration on the vertical axis and total volume of processed fluid, that is, filtered water, on the horizontal axis, differing results were obtained depending upon on the percentage of MC employed in a tablet. In general, additive concentration levels in the processed fluid tended to be significantly higher with a relatively lower concentration of MC in the table.

Turning now to FIG. 13b, trial data from an automated FAYP delivery mechanism is presented. As shown, the tablet active additives were Vitamin C (about 73%), Vitamin B5 (about 15%), and Vitamin B6 (about 3%), combined together in tablet form. Example tablets also included MC (about 4%), HPMC (about 3%), and about 2% sodium alginate (SA). The tablets were formed by pressing a mixture of the aforementioned ingredients with about 7 tons of pressure. In this trial, a half full pitcher of water (about 1123 mL) was used and the water dispensed in 355 mL aliquots, with about 6 seconds of rest between each dispensation.

With reference now to FIG. 13c, trial data from a hand poured FAYP delivery mechanism is presented. As shown, the tablet components were Vitamin C (about 73%), MC (about 5%), HPMC (about 3%) and SA (about 4%). The tablets were formed by pressing a mixture of the aforementioned ingredients with about 7 tons of pressure. In this trial, about 2 gallons per day were processed with the tablet extending over a 3 month period, where the 2 gallons were dispensed in aliquots of about 12 oz. each, with about 3-14 days time interval between each of the 2 gallon pours. Two different tablets of the same composition were used and used alternately so that successive 2 gallon pours used different respective tablets.

What is claimed is:

1. A fluid dispensing system, comprising:
an unfiltered water container body defining an internal storage volume configured to hold a volume of unfiltered water;
a lid body that is releasably attachable over the unfiltered water container body;
an inlet through the lid body through which unfiltered water may be introduced into the internal storage volume of the unfiltered water container body while the system is assembled;
a fluid outlet arranged for fluid communication with the internal storage volume of the unfiltered water container body, the fluid outlet passing through the lid body and spaced apart from the inlet to pass the filtered water out of the fluid dispensing system;
a filter element positioned in the internal storage volume of the unfiltered water container body and configured and arranged such that a water dispensing process can be performed in which a single continuous stream of unfiltered water from the unfiltered water container body can pass through the filter element and be dispensed out from the unfiltered water container body as a stream of filtered water; and
a water soluble tablet that comprises one or more additives and is positioned in the internal storage volume downstream of the filter element and positioned at the fluid outlet such that the filtered water can pass out of the filter element and into contact with the water soluble tablet prior to being dispensed out from the fluid outlet and out of the fluid dispensing system.

2. The fluid dispensing system as recited in claim 1, wherein the filter element is an element of a filter assembly that is positioned in the internal storage volume of the unfiltered water container body, and the water soluble tablet is positioned within the filter assembly.

3. The fluid dispensing system as recited in claim 2, wherein the filter assembly is detachably connectible to the lid.

4. The fluid dispensing system as recited in claim 2, wherein the water soluble tablet is configured in the form of an annular filter core cover positioned at an outlet end of a filter core of the filter assembly, wherein the filter element is positioned around the filter core.

5. The fluid dispensing system as recited in claim 1, wherein the unfiltered water container body comprises a pitcher.

6. The fluid dispensing system as recited in claim 1, wherein the water soluble tablet is configured to be replaced at approximately the same time as the filter element.

7. The fluid dispensing system as recited in claim 1, wherein the water soluble tablet delivers a substantially consistent concentration of additive to filtered water passing into contact with the water soluble tablet.

8. The fluid dispensing system as recited in claim 1, wherein the water soluble tablet has a generally donut-shaped configuration including a hole through which the filtered water is able to pass.

9. The fluid dispensing system as recited in claim 1, wherein the one or more additives in the water soluble tablet comprise any one or more of a nutritional additive, an agent, or a flavoring additive.

10. The fluid dispensing system as recited in claim 1, wherein the filter element comprises ACF.

11. The fluid dispensing system as recited in claim 1, wherein the filter element has a filter media configured to provide an exit flow rate of the fluid from the container in one or more of the following ranges: a range of about 0.3 GPM to about 2 GPM; a range of about 0.3 GPM to about 1 GPM; or a range of about 0.5 GPM to about 0.8 GPM.

12. The fluid dispensing system as recited in claim 1, wherein the inlet through the lid defines a fill path configured to allow unfiltered water to be directly introduced into the internal storage volume of the unfiltered water container body without passing through a filter.

13. A fluid dispensing system, comprising:
an unfiltered water container body defining an internal storage volume configured to hold a volume of unfiltered water;
a fluid outlet arranged for fluid communication with the internal storage volume of the unfiltered water container body;
a filter element positioned in the internal storage volume of the unfiltered water container body and configured and arranged such that a water dispensing process can be performed in which a single continuous stream of unfiltered water from the unfiltered water container body can pass through the filter element and be dispensed out from the unfiltered water container body as a stream of filtered water; and
a water soluble tablet that comprises one or more additives and is positioned in the internal storage volume downstream of the filter element and positioned at the fluid outlet such that the filtered water can pass out of the filter element and into contact with the water soluble tablet prior to being dispensed out from the fluid outlet and out of the fluid dispensing system;
wherein the filter element is an element of a filter assembly that is positioned in the internal storage volume of the unfiltered water container body, and the water soluble tablet is positioned within the filter assembly;
wherein the filter element includes a frame comprising a body having a first end and an opposing second end, the body defining one or more openings, the frame defining a channel within the body; and
an activated carbon textile filter media wrapped around the body to cover the one or more openings defined in the body;
the first end being closed and the second end being open to the channel;
wherein the water soluble tablet is positioned at the second open end relative to the channel and at the fluid outlet.

14. The fluid dispensing system as recited in claim 13, wherein the water soluble tablet is configured to be replaced the same time as the filter element.

15. The fluid dispensing system as recited in claim 13, wherein the water soluble tablet delivers a substantially consistent concentration of additive to filtered water passing into contact with the water soluble tablet.

16. The fluid dispensing system as recited in claim 13, wherein the water soluble tablet has a generally donut-shaped configuration including a hole through which filtered water is able to pass.

17. The fluid dispensing system as recited in claim 13, wherein fluid from the internal storage volume does not contact the water soluble tablet except when a dispensing operation is being performed.

18. The fluid dispensing system as recited in claim 13, wherein the one or more additives in the water soluble tablet comprise any one or more of a nutritional additive, an agent, or a flavoring additive.

19. The fluid dispensing system as recited in claim 13, wherein the unfiltered water container body is rigid.

20. The fluid dispensing system as recited in claim 13, wherein the water soluble tablet has an annular shape with a bore passing therethrough, the bore aligned with the channel in the frame.

* * * * *